US008600063B2

(12) United States Patent
Fukuda

(10) Patent No.: US 8,600,063 B2
(45) Date of Patent: Dec. 3, 2013

(54) KEY DISTRIBUTION SYSTEM

(75) Inventor: Naohiro Fukuda, Funabashi (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 68 days.

(21) Appl. No.: 12/998,805

(22) PCT Filed: Dec. 3, 2009

(86) PCT No.: PCT/JP2009/070284
§ 371 (c)(1),
(2), (4) Date: Jun. 3, 2011

(87) PCT Pub. No.: WO2010/064666
PCT Pub. Date: Jun. 10, 2010

(65) Prior Publication Data
US 2011/0235806 A1    Sep. 29, 2011

(30) Foreign Application Priority Data

Dec. 5, 2008    (JP) ................................. 2008-311360

(51) Int. Cl.
*H04L 9/08*    (2006.01)
(52) U.S. Cl.
USPC ............................. 380/282; 713/163; 713/169
(58) Field of Classification Search
None
See application file for complete search history.

(56) References Cited

U.S. PATENT DOCUMENTS

| 5,241,599 | A | 8/1993 | Bellovin et al. |
| 7,010,688 | B1 | 3/2006 | Kawasaki |
| 2002/0073229 | A1* | 6/2002 | Hayashi ....................... 709/237 |
| 2003/0046539 | A1* | 3/2003 | Negawa ........................ 713/163 |
| 2006/0143453 | A1* | 6/2006 | Imamoto et al. .............. 713/169 |
| 2009/0265539 | A1* | 10/2009 | Koyasu et al. ................ 713/150 |

FOREIGN PATENT DOCUMENTS

| JP | H06-169306 A1 | 4/1993 |
| JP | 11-196081 A | 7/1999 |
| JP | 2000-138674 A | 5/2000 |
| JP | 2000-349748 A | 12/2000 |
| JP | 2001-255815 A | 9/2001 |
| JP | 2002-198957 A | 7/2002 |

(Continued)

OTHER PUBLICATIONS

International Search Report dated Feb. 23, 2010, issued for PCT/JP2009/070284.

(Continued)

*Primary Examiner* — Andrew L Nalven
*Assistant Examiner* — Mohammed Waliullah
(74) *Attorney, Agent, or Firm* — Edwards Wildman Palmer LLP; James E. Armstrong, IV; George N. Chaclas

(57) ABSTRACT

The key distribution system comprises a terminal and a server which establish encrypted communication with each other by use of a common key cryptography using a communication secret key. To issue a new communication secret key, the terminal generates a secret value and encrypts it with a public key and sends the encrypted secret value to the server. The server decrypts the encrypted secret value with a private key paired with the public key. The server issues the new communication secret key, and encrypts it with a common key cryptography using the secret value, and sends the encrypted new communication secret key to the terminal. The terminal decrypts the encrypted new communication secret key with the secret value, thereby obtaining the new communication secret key. Thereafter, the terminal and the server use the new communication secret key.

3 Claims, 9 Drawing Sheets

(56) References Cited

FOREIGN PATENT DOCUMENTS

| JP | 2002-252610 A | 9/2002 |
| JP | 2003-069547 A | 3/2003 |
| WO | WO-2005/048008 A2 | 5/2005 |

OTHER PUBLICATIONS

Office Action issued in corresponding Japanese Patent Application No. 2008-311360 on Jun. 25, 2013.

I. Hideki et al., "Public-Key Cryptography and Digital Signature", Rinjibessatsu Suurikagaku Gendaiangoutomajikkupurotokoru, Kabusikikaisha Saiensusha, Sep. 25, 2000, pp. 38-47 (English Translation of 3.Public-Key Cryptography, p. 39 provided).

P. Janson et al., "Scalability and Flexibility in Authentication Services: The KryptoKnight Approach", INFOCOM '97, 16th Annual Joint Conference of the IEEE Computer and Communications Socieities, Pr. IEEE, Apr. 1997, vol. 2, pp. 725-736.

\* cited by examiner

KEY DISTRIBUTION SYSTEM

TECHNICAL FIELD

The present invention is directed to key distribution systems, and particularly to a key distribution system in which a server distributes to a terminal a communication secret key defined as a common key used in encrypted communication between the server and the terminal.

BACKGROUND ART

In the past, there has been provided a communication system which establishes encrypted communication using a session key having an available period. In this communication system, the session key is encrypted and then distributed. The session key is encrypted by use of common key cryptography which is referred to as KryptoKnight protocol, for example.

According to the common key cryptography, the same common key (hereinafter referred to as "communication secret key") is preliminarily given to the server (e.g., a residential server) and the terminal (e.g., an equipment device). Each terminal stores its own communication secret key, which remains unchanged even if the terminal becomes available by another user. Consequently, if a previous user of the terminal retrieves the communication secret key from the same terminal, the previous user can eavesdrop on communication between the server and the same terminal. Therefore, the previous user can monitor a usage situation (e.g., a lifestyle) of a current user of the same terminal, and can use the same terminal fraudulently (operate the same terminal without permission from the current user).

Document 1 (JP 2000-349748) discloses public key cryptography which offers higher security than the common key cryptography. Even if the public key cryptography is used, it is difficult to completely prevent the previous user from eavesdropping communication unless a public key and a private key are changed.

It has been proposed to change a public key and a public key in response to a change of a user. However, according to the public key cryptography disclosed in the document 1, one of a sender and a receiver has to hold a secret key (private key) paired with a public key of the other in order to share information with each other. Accordingly, the public key cryptography disclosed in the document 1 is unable to exchange the secret key itself.

DISCLOSURE OF INVENTION

In view of the above insufficiency, the present invention has been aimed to propose a key distribution system which enables a server to issue a communication secret key to a terminal for encrypted communication with the terminal in a safe and confidential manner.

The key distribution system comprises: a terminal; and a server connected to the terminal by way of a communication network. The terminal comprises: a first key storage unit configured to store a communication secret key and a public key in a rewritable manner; a first communication unit configured to establish encrypted communication with the server by use of a common key cryptography using the communication secret key stored in the first key storage unit; and a key request unit configured to, when requesting the server to issue a new communication key, generate newly a secret value defined as a numerical value, and generate a first secret code by encrypting the secret value with the public key stored in the first key storage unit, and send the first secret code to the server. The server comprises: a second key storage unit configured to store a decryption secret key and the communication secret key in a rewritable manner, the decryption secret key being defined as a private key paired with the public key; a second communication unit configured to establish the encrypted communication with the terminal by use of the common key cryptography using the communication secret key stored in the second key storage unit; and a key issuance unit configured to issue the new communication secret key in response to a request of issuing new communication keys from the terminal, and store the new communication secret key in the second key storage unit, and obtain the secret value by decrypting the first secret code with the decryption secret key, and generate a second secret code by encrypting the new communication secret key with the secret value, and send the second secret code to the terminal requesting issue of the new communication secret key. The key request unit is configured to decrypt the second secret code with the secret value to obtain the new communication secret key and store the obtained new communication secret key in the first key storage unit. The first communication unit is configured to, after the new communication secret key is stored in the first key storage unit, use the new communication secret key for establishing the encrypted communication with the server by use of the common key cryptography. The second communication unit is configured to, after the new communication secret key is stored in the second key storage unit, use the new communication secret key for establishing the encrypted communication with the terminal by use of the common key cryptography.

According to this key distribution system, when the terminal requests the server to issue the new communication secret key, the terminal encrypts the secret value with the public key and sends the encrypted secret value to the server. The server decrypts the encrypted secret value with the private key paired with the public key. The server encrypts the new communication secret key such that the encrypted new communication secret key can be decrypted with the secret value, and then transmits the encrypted new communication secret key to the terminal. The terminal decrypts the encrypted new communication secret key with the secret value, thereby obtaining the new communication secret key. Accordingly, this key distribution system enables the server to deliver the new communication secret key to the terminal in a secure manner.

In a preferred embodiment, the key request unit is configured to encrypt the newly generated secret value by use of, as the public key, the communication secret key stored in the first key storage unit, when requesting the server to issue the new communication secret key. The key issuance unit is configured to issue a new decryption secret key defined as a private key paired with the new communication secret key, in addition to the new communication secret key, in response to the request of issuing the new communication key from the terminal, and store the new decryption secret key in the second key storage unit. The key issuance unit is configured to, after the new decryption secret key is stored in the second key storage unit, use the new decryption secret key for decrypting the first secret code.

This key distribution system uses the communication secret key as the public key. Therefore, only the server can decrypt the encrypted secret value. An unauthorized person cannot decrypt the encrypted secret value even by use of the communication secret key. Consequently, it is possible to deliver the new communication secret key from the server to the terminal in a secure manner.

In a preferred embodiment, the key request unit is configured to generate a first random number used as the secret value, and a second random number, and send the second random number to the server before requesting the server to issue the new communication secret key, and make simple calculation of the first random number and the second random number to generate a communication numerical value, and encrypt the communication numerical value with the public key, and send the encrypted communication numerical value to the server.

This key distribution system can keep the secret value secret from an unauthorized person, thereby reducing the chance of the unauthorized person being able to acquire the new communication secret key. Further, the communication numerical value which is greater in the number of digits than the secret value is used only for transmitting the secret value from the server to the terminal. Therefore, the terminal and the server need not perform decryption and encryption of the communication secret key with the communication numerical value greater in the number of digits than the secret value. Consequently, it is possible to reduce an amount of processing of the terminal and the server.

In a preferred embodiment, the key issuance unit is configured to, in response to the request of issuing the new communication secret key from the terminal, issue a message code including the secret value received from the terminal, and encrypt the new communication secret key with the message code, and send the encrypted new communication secret key to the terminal.

According to this key distribution system, with performing the message authentication, it enables both the server and the terminal to detect the communication secret key which has been falsified by an unauthorized person. Therefore, it is possible to improve security of the encrypted communication using the communication secret key.

Another key distribution system in accordance with the present embodiment comprises: a terminal; and a server connected to the terminal by way of a communication network. The terminal comprises: a first key storage unit configured to store a communication secret key in a rewritable manner; a first primitive root storage unit configured to store a predetermined primitive root; a first communication unit configured to establish encrypted communication with the server by use of a common key cryptography using the communication secret key stored in the first key storage unit; and a key request unit configured to, when requesting the server to issue a new communication key, generate newly a secret value defined as a numerical value, and generate a first public key based on the Diffie-Hellman key agreement protocol by use of the first secret value and the primitive root stored in the first primitive root storage unit, and send the first public key to the server. The server comprises: a second key storage unit configured to store the communication secret key; a second primitive root storage unit configured to store the predetermined primitive root; a second communication unit configured to establish the encrypted communication with the terminal by use of the common key cryptography using the communication secret key stored in the second key storage unit; and a key issuance unit configured to generate newly a second secret value defined as a numerical value in response to a request of issuing the new communication key from the terminal, and generate a common key based on the Diffie-Hellman key agreement protocol by use of the first public key received from the terminal and the second secret value, and generate a second public key based on the Diffie-Hellman key agreement protocol by use of the second secret value and the primitive root stored in the second primitive root storage unit, and encrypt the new communication secret key with the common key based on the Diffie-Hellman key agreement protocol, and send the encrypted new communication secret key and the second public key to the terminal requesting issue of the new communication secret key. The key request unit is configured to, upon receiving the encrypted new communication secret key and the second public key from the server, generate the common key based on the Diffie-Hellman key agreement protocol by use of the newly generated first secret value and the second public key received from the server, and decrypt the encrypted new communication secret key with the generated common key based on the Diffie-Hellman key agreement protocol to obtain the new communication secret key, and store the new communication secret key in the first key storage unit. The first communication unit is configured to, after the new communication secret key is stored in the first key storage unit, use the new communication secret key for establishing the encrypted communication with the server by use of the common key cryptography. The second communication unit is configured to, after the new communication secret key is stored in the second key storage unit, use the new communication secret key for establishing the encrypted communication with the terminal by use of the common key cryptography.

Accordingly, this key distribution system encrypts the new communication secret key with the common key based on the Diffie-Hellman key agreement protocol, and transmits the encrypted new communication secret key to the terminal. Therefore, even an unauthorized person who knows the previous communication secret key cannot decrypt the encrypted new communication secret key. Consequently, it is possible to deliver the new communication secret key to the terminal in a secure manner.

BEST MODE FOR CARRYING OUT THE INVENTION

First Embodiment

Figure 1:
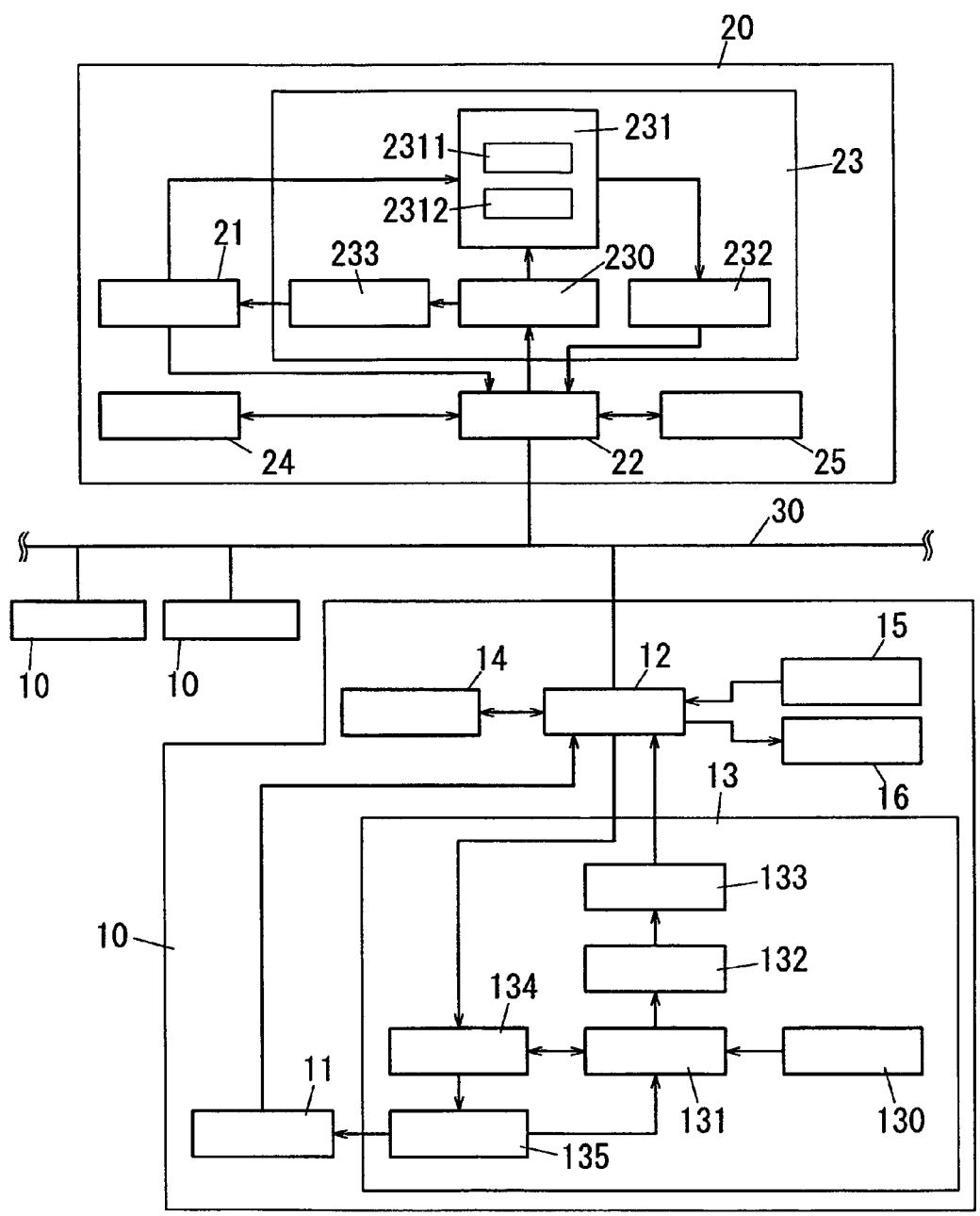
FIG. 1 is a block diagram illustrating the key distribution system of the first embodiment.

As shown in FIG. 1, the key distribution system of the present embodiment includes plural terminals 10 and a server 20. The server 20 is connected to each terminal 10 by use of a communication network 30. The communication network 30 may be a wide area network or a local area network. Each of the terminals 10 and the server 20 comprises a communication interface configured to make connection with the communication network 30, a memory configured to store predetermined data, and a microcomputer configured to perform predetermined functions.

The terminal 10 is connected to the server 20 via the communication network 30. The terminal 10 includes a first key storage unit 11, a first communication unit 12, a key request unit 13, a first identification information storage unit 14, a session key request unit 15, and a session key reception unit 16.

The first key storage unit 11 is a rewritable storage medium. The first key storage unit 11 is configured to store both a communication secret key and a session key. Besides, in the present embodiment, the communication secret key is used as a public key. In other words, the first key storage unit 11 stores both the communication secret key and the public key.

The first identification information storage unit 14 is a rewritable storage medium, for example. The first identification information storage unit 14 is configured to store identification information (identifiers) for identifying the terminal 10 and the server 20 in the key distribution system. The identification information is defined as peculiar (unique) information regarding the key distribution system. For example, the identification information is MAC addresses, IP addresses of IPv6, or addresses used in a local area network.

The first communication unit 12 is provided for establishing encrypted communication between the terminal 10 and the server 20. The first communication unit 12 is configured to establish encrypted communication with the server 20 by use of common key cryptography using the communication secret key stored in the first key storage unit 11. In addition, the first communication unit 12 is configured to establish the encrypted communication with the server 20 by use of the session key stored in the first key storage unit 11 as a common key. The first communication unit 12 is configured to transmit a packet which includes identification information indicative of a sender (identification information of the terminal 10), identification information indicative of destination (identification information of the server 20), and a message. The message included in the packet is encrypted with the communication secret key or the session key.

The key request unit 13 is configured to perform processing (issuance request processing) of requesting the server 20 to issue the communication secret key, and processing of receiving the communication secret key.

The key request unit 13 is employed for changing the communication secret key in response to a change of a user of the terminal 10, for example. The issuance request processing is started when a user performs a particular manipulation such as a manipulation of a switch for starting the issuance request processing. Besides, the terminal 10 may be configured to start the issuance request processing automatically when the terminal 10 is connected to the communication network 30 (when the terminal 10 transmits a packet for announcing entry of the communication network 30). After the terminal 10 is connected to the communication network 30, the terminal 10 may perform the issuance request processing regularly or irregularly. In this instance, a first time interval at which the terminal 10 performs the issuance request processing may be selected to be sufficiently longer than a second time interval at which the terminal 10 performs the processing of requesting the issuance of session key. For example, when the second time interval is about one day, the first time interval is preferred to be one month or more.

The session key request unit 15 is configured to perform processing of requesting the server 20 to issue the session key.

The session key reception unit 16 is configured to perform processing of receiving the session key from the server 20.

The server 20 includes a second key storage unit 21, a second communication unit 22, a key issuance unit 23, a second identification information storage unit 24, and a session key issuance unit 25.

The second key storage unit 21 is a rewritable storage medium. The second key storage unit 21 is configured to store the communication secret key and the session key. The second key storage unit 21 is, further, configured to store a decryption secret key defined as a private key paired with the communication secret key.

As understood from the above, the communication secret key and the decryption secret key are cryptographic keys which constitute a cryptographic key pair. That is, a relationship between the communication secret key and the decryption secret key is the same as a relationship between a public key and a secret key (private key) of public key cryptography. In other words, the decryption secret key is a private key used for decrypting a message which has been encrypted with the communication secret key as a public key. Thus, in order to decrypt a message (cryptograph) which has been encrypted with the communication secret key (equivalent to a public key of public key cryptography), not the communication secret key but the decryption secret key (equivalent to a private key of public key cryptography) is necessary. Further, in order to decrypt a message (cryptograph) which has been encrypted with the decryption secret key, the communication secret key is necessary.

According to the key distribution system of the present embodiment, the terminal 10 and the server 20 can establish encrypted communication by use of the public key cryptography.

The second key storage unit 21 is configured to store bunches of keys comprising the communication secret key, the decryption secret key, and the session key respectively associated with the terminals 10 connected to the server 20. That is, the identification information of the terminal 10 is associated with each of the communication secret key, the decryption secret key, and the session key.

The second identification information storage unit 24 is a rewritable storage medium, for example. The second identification information storage unit 24 is configured to store the aforementioned identification information.

The second communication unit 22 is provided for establishing encrypted communication between the terminal 10 and the server 20. The second communication unit 22 is configured to establish the encrypted communication with the terminal 10 by use of the common key cryptography using the communication secret key stored in the second key storage unit 21. In addition, the second communication unit 22 is configured to establish the encrypted communication with the terminal 10 by use of the session key stored in the second key storage unit 21 as the common key. The second communication unit 22 is configured to transmit a packet which includes identification information indicative of a sender (identification information of the server 20), identification information indicative of destination (identification information of the terminal 10), and a message. The message included in the packet is encrypted with the communication secret key or the session key.

The key issuance unit 23 is configured to perform processing of issuing the communication secret key in response to a request of issuing the communication key from the terminal 10.

The session key issuance unit 25 is configured to perform processing of issuing the session key in response to a request of issuing the session key from the terminal 10. That is, the server 20 issues the session key in response to the request from the terminal 10.

In the present embodiment, the server 20 is configured to distribute to the terminals 10 the session key used for encrypting the message which is transmitted between the server 20 and the terminal 10.

The terminal 10 is an equipment device which is installed in a residence and has a communication function, for example. The server 20 is an authentication server, for example. The server 20 is realized by use of a residential server configured to communicate to each equipment device (terminal 10) in the residence. The server 20 enables a user to control and monitor each equipment device (terminal 10) in the residence.

The session key request unit 15 is configured to generate a nonce (first nonce) when requesting the server 20 to distribute the session key. The first nonce is defined as a numerical value which is used only one time. The first nonce is a random number, for example. The session key request unit 15 controls the first communication unit 12 in a manner to transmit to the server 20 a message including the first nonce, a session key request message (session key request command), and the identification information of the terminal 10. The session key request message is defined as a command for requesting issuance of the session key.

Besides, the packet which is transmitted by the first communication unit 12 includes the sender address (identification information of the sender) and the destination address (identification information of the destination). Therefore, the server 20 can get the identification information of the terminal 10 from the sender address. Thus, the identification information of the terminal 10 can be omitted from the aforementioned message.

Upon receiving the session key request message from the terminal 10, the session key issuance unit 25 generates the session key and stores the same session key in the second key storage unit 21. Moreover, the session key issuance unit 25 encrypts the session key with the communication secret key stored in the second key storage unit 21. In order to encrypt the session key, the session key issuance unit 25 generates a second message authentication code (second message code) by use of the communication secret key. The session key issuance unit 25 calculates an exclusive disjunction of the second message authentication code and the session key, and uses the calculated exclusive disjunction as the encrypted session key. In other words, the session key issuance unit 25 encrypts the session key using the second message authentication code as a common key. Information necessary for generating the second message authentication code includes the identification information of the terminal 10 and the first nonce which are received from the terminal 10. Further, the information necessary for generating the second message authentication code includes a nonce (second nonce) generated by the session key issuance unit 25 and the identification information of the server 20. The session key issuance unit 25 controls the second communication unit 22 in a manner to transmit to the terminal 10 both the encrypted session key and the second nonce.

Upon receiving the encrypted session key and the second nonce from the server 20, the session key reception unit 16 decrypts the encrypted session key. In order to decrypt the encrypted session key, the session key reception unit 16 generates a first message authentication code (first message code) which has the same value as that of the second message authentication code. The terminal 10 knows the identification information of the terminal 10, the first nonce, the identification information of the server 20, and the communication secret key. Therefore, when receiving the second nonce from the server 20, the terminal 10 can generate the first message authentication code.

The encrypted session key is an exclusive disjunction of the second message authentication code and the session key. Therefore, the session key can be obtained by means of calculating an exclusive disjunction of the encrypted session key and the first message authentication code.

The session key reception unit 16 stores the obtained session key in the first key storage unit 11. Besides, the session key reception unit 16 may be configured to update the previous session key stored in the first key storage unit 11 to the newly obtained session key.

The key request unit 13 includes a secret value generation module 130, a secret value storage module 131, a secret value encryption module 132, and a secret value transmission module 133.

The secret value generation module 130 generates newly a secret value defined as a numerical value in processing of requesting issuance of a new communication secret key. The secret value is a random number. In other words, the secret value generation module 130 generates the secret value having a random numerical value, every time the processing of requesting issuance of the new communication secret key is performed. Therefore, the secret value is changed every time the processing is made to request the issuance of the new communication secret key. The terminal 10 uses the same secret value until the terminal 10 receives the new communication secret key.

The secret value storage module 131 is configured to store the secret value generated by the secret value generation module 130. Besides, the secret value storage module 131 may be configured to, when the secret value storage module 131 already stores the secret value, update the stored secret value to the new secret value generated by the secret value generation module 130.

The secret value encryption module 132 is configured to encrypt the secret value stored in the secret value storage module 131 to generate a first secret code. The secret value encryption module 132 encrypts the secret value with the communication secret key stored in the first key storage unit 11 as a public key. For example, the secret value encryption module 132 generates the first secret code by encrypting the secret value by use of public key cryptography (e.g., RSA) using the communication secret key stored in the first key storage unit 11 at the time of starting the processing of requesting the new communication secret key.

The secret value transmission module 133 is configured to control the first communication unit 12 in a manner to transmit to the server 20 the first secret code which is generated by the secret value encryption module 132, in addition to a request message (request command) of requesting issuance of the new communication secret key. The secret value transmission module 133 controls the first communication unit 12 in a manner to transmit the identification information of the terminal 10 together with the first secret code.

The key issuance unit 23 includes a key generation module 230, a communication secret key encryption module 231, a communication secret key transmission module 232, and a second keeping module 233.

The key generation module 230 is configured to generate a new communication secret key, when the second communication unit 22 receives the request message from the terminal 10. Further, the key generation module 230 is configured to generate a new decryption secret key paired with the new communication secret key, when the second communication unit 22 receives the request message.

The communication secret key encryption module 231 includes a secret value obtaining section 2311, and an encryption section 2312.

The secret value obtaining section 2311 is configured to, when the second communication unit 22 receives the request message, decrypt the first secret code received by the second communication unit 22 to obtain the secret value. The secret value obtaining section 2311 decrypts the first secret code with the decryption secret key paired with the communication secret key. Besides, the secret value obtaining section 2311 uses the identification information of the terminal 10 as a retrieval key to retrieve the decryption secret key paired with the communication secret key of the terminal 10.

The encryption section 2312 is configured to encrypt the new communication secret key with the secret value obtained from the secret value obtaining section 2311 as a common key to generate a second secret code. The encryption section 2312 uses an exclusive disjunction of the new communication secret key and the secret value as the second secret code (encrypted new communication secret key), for example.

The communication secret key transmission module 232 is configured to control the second communication unit 22 in a manner to transmit the second secret code to the terminal 10 which requests issuance of the new communication secret key.

The second keeping module 233 is configured to store the new communication secret key generated by the key generation module 230 and the new decryption secret key in the second key storage unit 21. Besides, the second keeping module 233 may be configured to update the old communication secret key stored in the second key storage unit 21 to the new communication secret key generated by the key generation module 230. Further, the second keeping module 233 may be configured to update the old decryption secret key stored in the second key storage unit 21 to the new decryption secret key generated by the key generation module 230.

As described in the above, the key issuance unit 23 issues the new communication secret key and stores it in the second key storage unit 21 in response to the request of issuing the new communication secret key from the terminal 10. The key issuance unit 23 decrypts the first secret code with the decryption secret key, thereby obtaining the secret value. The key issuance unit 23 encrypts the new communication secret key with the secret value, thereby generating the second secret code. The key issuance unit 23 transmits the second secret code to the terminal 10 which requests issuance of the new communication secret key.

Further, the key issuance unit 23 issues the new communication secret key and the new decryption secret key defined as a private key paired with the new communication secret key, in response to the request of issuing the new communication secret key from the terminal 10. Thereafter, the key issuance unit 23 stores both the new communication secret key and the new decryption secret key in the second key storage unit 21. After the second key storage unit 21 stores the new decryption secret key, the key issuance unit 23 adopts the new decryption secret key for decryption of the first secret code.

Since the second key storage unit 21 stores the new communication secret key, the second communication unit 22 uses the new communication secret key rather than the old communication secret key in order to establish the encrypted communication with the terminal 10 by use of the common key cryptography using the communication secret key.

The key request unit 13 further includes a communication secret key decryption module 134 and a first keeping module 135.

The communication secret key decryption module 134 is configured to, when the first communication unit 12 receives the second secret code, decrypt the second secret code received by the first communication unit 12 with the secret value stored in the secret value storage module 131 to obtain the new communication secret key. The second secret code is the exclusive disjunction of the secret value and the new communication secret key. The new communication secret key can be obtained by means of calculating an exclusive disjunction of the second secret code and the secret value. Besides, the communication secret key decryption module 134 may be configured to delete the secret value from the secret value storage module 131 after the new communication secret key is obtained.

The first keeping module 135 is configured to store the new communication secret key obtained by the communication secret key decryption module 134 in the first key storage unit 11. Besides, the first keeping module 135 may be configured to update the old communication secret key stored in the first key storage unit 11 with the new communication secret key.

As described in the above, the key request unit 13 generates newly the secret value defined as a numerical value in order to request the server 20 to issue the new communication secret key. The key request unit 13 generates the first secret code by encrypting the secret value with the communication secret key stored in the first key storage unit 11 as a public key, and transmits the generated first secret code. The key request unit obtains the new communication secret key by decrypting the second secret code with the secret key, and stores the new communication secret key in the first key storage unit 11.

Since the first key storage unit 11 stores the new communication secret key, the second communication unit 12 uses the new communication secret key rather than the old communication secret key in order to establish encrypted communication with the server 20 by use of the common key cryptography using the communication secret key.

Figure 2:
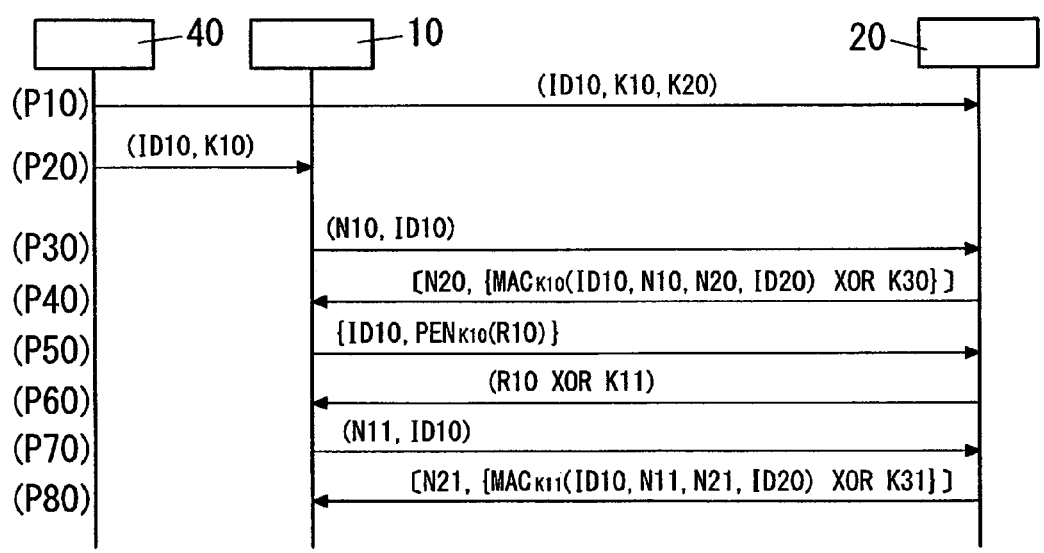
FIG. 2 is a diagram illustrating operation of the key distribution system of the first embodiment.
Figure 3:
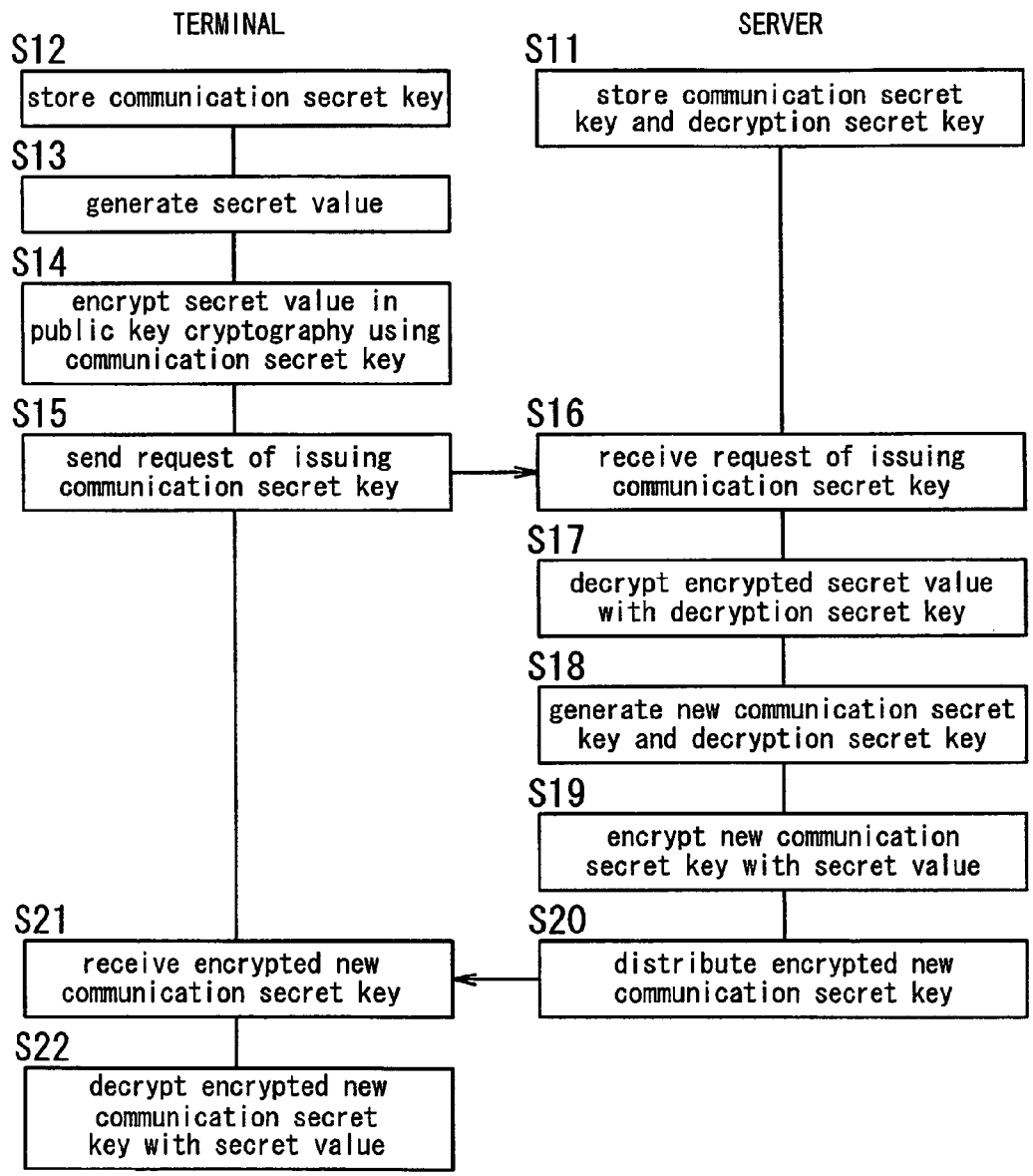
FIG. 3 is a flow chart illustrating the operation of the key distribution system of the first embodiment.

Next, an explanation is made to operation of the key distribution system of the present embodiment with reference to FIGS. 2 and 3.

Besides, before shipment of the terminal 10, processing of registering the communication secret key in the terminal 10 and processing of registering both the communication secret key and the decryption secret key in the server 20 are performed. A management device (product management device) 40 is used for registration of the communication secret key and the decryption secret key. In processing of registering the communication secret key and the decryption secret key, the management device 40 is connected to the server 20 and the terminal 10 via a communication path such as the Internet.

As shown in FIG. 2, the management device 40 sends both the communication secret key K10 and the decryption secret key K20 to the server 20 (process P10 in FIG. 2). The server 20 registers the communication secret key K10 and the decryption secret key K20 received from the management device 40 in the second key storage unit 21 (step S11 in FIG. 3). The management device 40 communicates to the server 20 in a manner such as SSL (Secure Socket Layer) and TLS (Transport Layer Security) in order to prevent leakage of the communication secret key K10 and the decryption secret key K20.

Further, the management device 40 sends to the server 20 the identification information (terminal identification information) ID10 for identifying the terminal 10. The server 20 registers the identification information ID10 received from the management device 40 in the second identification information storage unit 24. Besides, when an EMIT (Embedded Micro Internetworking Technology) is installed in the terminal 10 as middleware for connecting devices to the communication network, an object ID determined by the EMIT can be adopted as the terminal identification information ID10.

The management device 40 sends to the terminal 10 both the identification information ID10 of the terminal 10 and the communication secret key K10 registered in the server 20 (process P20 in FIG. 2). The terminal 10 registers the identification information ID10 received from the management device 40 in the first identification information storage unit 14. In addition, the terminal 10 registers the communication secret key K10 received from the management device 40 in the first key storage unit 11 (step S12 in FIG. 3).

That is, the communication secret key K10 is registered, as an initial secret key, in both the second key storage unit 21 of the server 20 and the first key storage unit 11 of the terminal 10. Further, the decryption secret key K20 is registered, as an initial secret key associated with the communication secret key K10, in the second key storage unit 21 of the server 20.

According to the key distribution system of the present embodiment, the server 20 distributes the session key to the terminal 10 in accordance with the following procedure.

In the processing where the terminal 10 requests the server 20 to issue session keys, the session key request unit 15 generates the first nonce N10. The session key request unit 15 controls the first communication unit 12 in a manner to transmit to the server 20 the first nonce N10 and the session key request message together with the identification information ID10 of the terminal 10 (process P30 in FIG. 2).

When the second communication unit 22 receives the session key request message, the session key issuance unit 25 generates the session key K30. The session key issuance unit 25 generates the second message authentication code $MAC_{K10}(I20)$ by use of the communication secret key K10 stored in the second key storage unit 21 and information I20. The information I20 includes the identification information ID10 of the terminal 10 and the first nonce N10 received from the terminal 10. The information I20 further includes the second nonce N20 and the identification information (server identification information) ID20 of the server 20. In other words, the information I20 is represented as a function (ID10, N10, N20, ID20).

The session key issuance unit 25 calculates an exclusive disjunction of the second message authentication code $(=MAC_{K10}(ID10, N10, N20, ID20))$ and the session key K30, thereby generating the encrypted session key $(=[MAC_{K10}(ID10, N10, N20, ID20) \text{ XOR } K30])$. The session key issuance unit 25 controls the second communication unit 22 in a manner to transmit to the terminal 10 the encrypted session key together with the second nonce N20 (process P40 in FIG. 2).

Besides, when the server does not receive the identification information ID10 from the terminal 10 in the process P30, the identification information ID10 may be omitted from the information I20.

In summary, the terminal 10 operates to transmit the first nonce N10 and the identification information ID10 to the server 20 when requesting the server to issue the session key (process P30 in FIG. 2). The server 20 transmits the encrypted session key $(=[MAC_{K10}(ID10, N10, N20, ID20) \text{ XOR } K30])$ together with the second nonce N20 in response to the request from the terminal 10 (process P40 in FIG. 2).

When the first communication unit 12 receives the encrypted session key and the second nonce N20, the session key reception unit 16 generates the first message authentication code.

The session key reception unit 16 calculates an exclusive disjunction of the first message authentication code $(=MAC_{K10}(ID10, N10, N20, ID20))$ and the encrypted session key $(=[MAC_{K10}(ID10, N10, N20, ID20) \text{ XOR } K30])$, thereby obtaining the session key K30. The session key reception unit 16 stores the received session key K30 in the first key storage unit 11.

The terminal 10 receives the session key K30 from the server 20 in the above manner. The terminal 10 uses the session key K30 received from the server 20 for establishing communication with the server 20 unless the session key K30 expires.

According to the key distribution system of the present embodiment, the server 20 distributes the communication secret key to the terminal 10 in accordance with the following procedure.

When the issuance request processing is started, the secret value generation module 130 generates the secret value R10 which is a random number (step S13 in FIG. 3). The secret value storage module 131 stores the secret value R10. The secret value encryption module 132 encrypts the secret value R10 with the communication secret key K10 stored in the first key storage unit 11 as a public key, thereby generating the first secret code $PEN_{K10}(R10)$ (step S14 in FIG. 3). The secret value transmission module 133 controls the first communication unit 12, thereby sending to the server 20 the first secret code $PEN_{K10}(R10)$ together with the identification information ID10 of the terminal 10 and the request message (step S15 in FIG. 3, and process P50 in FIG. 2). Thus, the terminal 10 transmits the identification information ID10 of the terminal 10 and the first secret code $PEN_{K10}(R10)$ in the processing of requesting the server 20 to issue the new communication secret key.

Only the decryption secret key K20 can decrypt the first secret code $PEN_{K10}(R10)$ while the message is available (i.e., until the next communication secret key K11 is distributed to the terminal 10). Therefore, an unauthorized person cannot obtain the secret value R10 even if the unauthorized person knows the communication secret key K10.

When the second communication unit 22 receives the request message (step S16 in FIG. 3), the secret value obtaining section 2311 decrypts the first secret code $PEN_{K10}(R10)$ with the decryption secret key K20 stored in the second key storage unit 21, thereby obtaining the secret value R10 (step S17 in FIG. 3).

Further, the key generation module 230 generates the new communication secret key K11 and the new decryption secret key K21 which is paired with the new communication secret key K11 (step S18 in FIG. 3).

The encryption section 2312 encrypts the new communication secret key K11 by use of, as a common key, the secret value R10 obtained from the secret value obtaining section 2311, thereby generating the second secret code (step S19 in FIG. 3). In the present embodiment, the encryption section 2312 uses, as the second secret code, the exclusive disjunction $(=[R10 \text{ XOR } K11])$ of the new communication secret key K11 and the secret value R10.

The second keeping module 233 stores, in the second key storage unit 21, both the new communication secret key K11 and the new decryption secret key K21 which are generated by the key generation module 230.

The communication secret key transmission module 232 controls the second communication unit 22, thereby transmitting the second secret code to the terminal 10 which requests issuance of the new communication secret key (step S20 in FIG. 3, and process P60 in FIG. 2). Thus, the server 20 transmits the second secret code (=[R10 XOR K11]) to the terminal 10.

When the first communication unit 12 receives the second secret code (step S21 in FIG. 3), the communication secret key decryption module 134 calculates an exclusive disjunction of the second secret code (=[R10 XOR K11]) and the secret value R10, thereby obtaining the new communication secret key K11 (step S22 in FIG. 3).

The first keeping module 135 stores in the first key storage unit 11 the new communication secret key K11 obtained by the communication secret key decryption module 134.

After the new communication secret key K11 is stored in the first key storage unit 11, the first communication unit 12 uses the new communication secret key K11 for establishing the encrypted communication with the server 20 in the common key cryptography. After the new communication secret key K11 is stored in the second key storage unit 21, the second communication unit 22 uses the new communication secret key K11 for establishing the encrypted communication with the terminal 10 in the common key cryptography.

Therefore, after the new communication secret key K11 is issued, an unauthorized person cannot eavesdrop on the communication between the terminal 10 and the server 20 even if the unauthorized person knows the previous communication secret key K10.

After the terminal 10 obtains the new communication secret key K11 from the server 20, the server 20 distributes the session key to the terminal 10 in accordance with the following procedure.

When the terminal 10 requests the server 20 to issue the session key, the session key request unit 15 generates the first nonce N11 which is different in a value from the first nonce N10. The session key request unit 15 controls the first communication unit 12 so as to transmit to the server 20 the first nonce N11 and the session key request message together with the identification information ID10 of the terminal 10 (process P70 in FIG. 2).

When the second communication unit 22 receives the session key request message, the session key issuance unit 25 generates the session key K31 which is different from the session key K30, and stores the session key K31 in the second key storage unit 21. The session key issuance unit 25 generates the second message authentication code $MAC_{K11}(I21)$ by use of the communication secret key K11 stored in the second key storage unit 21 and information I21. The information I21 includes the identification information ID10 of the terminal 10 and the first nonce N11 received from the terminal 10. The information I21 further includes the second nonce N21 which is different in a value from the second nonce N20, and the identification information (server identification information) ID20 of the server 20. In other words, the information I21 is represented as a function (ID10, N11, N21, ID20).

The session key issuance unit 25 generates the encrypted session key (=[$MAC_{K11}$(ID10, N11, N21, ID20) XOR K31]), and transmits the encrypted session key together with the second nonce N21 to the terminal 10 (process P80 in FIG. 2).

When the first communication unit 12 receives the second nonce N21 and the encrypted session key, the session key reception unit 16 generates the first message authentication code.

The session key reception unit 16 calculates an exclusive disjunction of the first message authentication code (=$MAC_{K11}$(ID10, N11, N21, ID20)) and the encrypted session key (=[$MAC_{K11}$(ID10, N11, N21, ID20) XOR K31]), thereby obtaining the session key K31. The session key reception unit 16 stores the received session key K31 in the first key storage unit 11.

The terminal 10 receives the new session key K31 from the server 20 in the above manner.

According to the present embodiment, the terminal 10 encrypts the secret value with the public key and transmits the encrypted secret value to the server 20 when the terminal 10 requests the server 20 to issue the new communication secret key. The server 20 decrypts the encrypted secret key with the private key paired with the public key which the terminal uses. The server 20 encrypts the new communication secret key such that the encrypted new communication secret key can be decrypted with the secret value. The server 20 sends the encrypted new communication secret key to the terminal 10. The terminal 10 decrypts the encrypted new communication secret key with the secret value, thereby obtaining the new communication secret key.

In a situation where a user of the terminal 10 would have been changed, a previous user might get the communication secret key but could not get the private key paired with the public key and therefore could not know the secret value. Consequently, the secret value can be kept confidential and used in a secure manner. Further, since the secret value is available only within a period from a time when the terminal 20 requests the server to issue the new communication secret key to a time when the terminal receives the new communication secret key, an unauthorized person has a very rare chance of obtaining the secret value within a time period where the secret value is still available. Thus, by use of the secret value for encryption of the new communication secret key, the server 20 is enabled to send the new communication secret key to the terminal 10 in a secure manner.

As described in the above, the key distribution system of the present embodiment can derive the new communication secret key from the server 20 to the terminal 10 in a secure manner.

Further, since the communication secret key is used as a public key, only the server 20 can decrypt the encrypted secret value. An unauthorized person cannot decrypt the encrypted secret value even if the unauthorized person uses the communication secret key. The new communication secret key can be securely transferred from the server 20 to the terminal 10.

Besides, with using the communication secret key and the decryption secret key, the server 20 can distribute the session key used by only the particular terminal 10 with keeping the session key secret from an unauthorized person. The processing (session-key update processing) in which the server 20 distributes the new session key to the terminal 10 is performed in response to a change of a user who uses the terminal 10.

The session key may be updated regularly, irregularly, or at a proper timing. For example, the session-key update processing may be performed repeatedly while the same user uses the terminal 10. Normally, the session key is defined as a disposable secret key. Therefore, the terminal 10 may be configured to hold the same session key until a predetermined available period (e.g. 1 day) elapses, for example. In this instance, when the session-key update processing is performed within the available period, the terminal 10 discards the previous session key before the available period thereof elapses.

When the terminal 10 is ready for communication with the server 20 by use of the session key, the terminal 10 is under surveillance by the server 20. The terminals 10, which have the individual session keys different from each other but are surveyed by the common server 20, are classified into the same group. Actually, it is not designed to distribute the same session key to a plurality of the terminals 10.

It is assumed that the server 20 is a residential server, and that the first terminal 10 is a switch, and that the second terminal 10 is a lighting apparatus. Further, it is assumed that the server 20 distributes the different session keys to the first terminal 10 and the second terminal 20, respectively. In this instance, the server 20 stores and manages the session keys respectively distributed to the terminals 10. Therefore, the first terminal 10 and the second terminal 10 can be grouped as residential equipment devices installed in the same residence. The key distribution system can bind the terminals 10 belonging to the same group such that the terminals 10 communicate to each other. The terminals 10 which are bound can communicate to each other via the server 20. For example, in the above instance, the second terminal 10 defined as the lighting device can be operated in response to manipulation of the first terminal 10 defined as the switch.

Besides, in order to reduce probability that an unauthorized person reads out the new communication secret key, the second secret code (=[R10 XOR K11]) is preferred to be further encrypted. For example, the encryption section 2312 of the server 20 may encrypt the second secret code by means of common key cryptography (e.g., DES, 3-DES, and AES) using the previous communication secret key K10. In this instance, the communication secret key decryption module 134 of the terminal 10 is configured to decrypt the encrypted second secret code with the previous communication secret key K10 and subsequently calculate an exclusive disjunction of the second secret and the secret value R10 to obtain the new communication secret key K11. With this arrangement, the previous user cannot easily know what is used for a decryption algorithm in the terminal 10, even if the previous user knows the communication secret key K10. Further, the previous user needs to know also the secret value R10. Therefore, it is possible to considerably reduce the probability that an unauthorized person obtains the new communication secret key.

Second Embodiment

Figure 4:
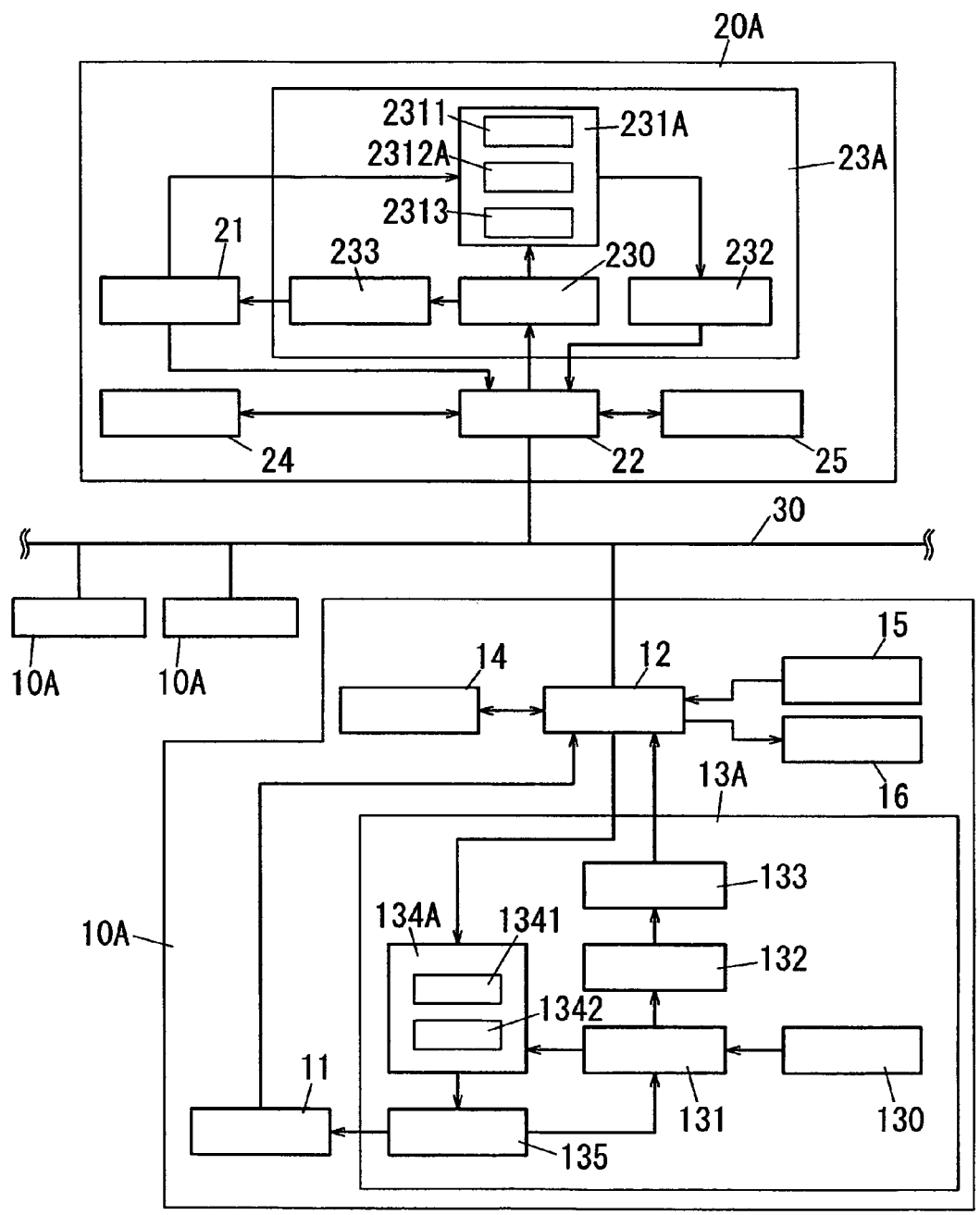
FIG. 4 is a block diagram illustrating the key distribution system of the second embodiment.

As shown in FIG. 4, the key distribution system of the present embodiment is different from the first embodiment in both the terminal 10A and the server 20A. Components of the key distribution system which are common to the present embodiment and the first embodiment are designated by the same reference numerals, and no explanations thereof are deemed necessary.

The server 20A is different from the server 20 of the first embodiment in the communication secret key encryption module 231A of the key issuance unit 23A.

The communication secret key encryption module 231A includes the secret value obtaining section 2311, the encryption section 2312A and an encryption key generation section 2313.

The encryption key generation section 2313 is configured to generate an encryption key defined as a message authentication code (message code) including the secret value, by use of, as the common key, the communication secret key (which is not the new communication secret key but is the communication secret key stored in the terminal 10A) stored in the second key storage unit 21.

The encryption section 2312A is configured to encrypt the new communication secret key by use of, as the common key, the encryption key obtained from the encryption key generation section 2313 to generate the second secret code. The encryption section 2312A adopts as the second secret code (i.e., the encrypted new communication secret key) an exclusive disjunction of the encryption secret key obtained from the encryption key generation section 2313 and the new communication secret key.

As described in the above, the key issuance unit 23A of the present embodiment generates the message authentication code including the secret value which is received from the terminal 10A, when the key issuance unit 23A is requested by the terminal 10A to issue the new communication secret key. The key issuance unit 23A encrypts the new communication secret key by use of the message authentication code and sends the encrypted new communication secret key to the terminal 10A.

The terminal 10A is different from the terminal 10 of the first embodiment in the communication secret key decryption module 134A of the key request unit 13A.

The communication secret key decryption module 134 includes a decryption key generation section 1341 and a decryption section 1342.

When the first communication unit 12 receives the second secret code, the decryption key generation section 1341 generates a decryption key by use of the communication secret key stored in the first key storage unit 11 and the secret value stored in the secret value storage module 131. The decryption key is defined as a message authentication code which has the same value as that of the encryption key generated by the encryption key generation section 2313. In brief, the decryption key generation section 1341 generates the message authentication code including the secret value, by use of, as the common key, the communication secret key stored in the first key storage unit 11.

The decryption section 1342 is configured to decrypt the second secret code by use of, as the common key, the decryption key obtained from the decryption key generation section 1341 to obtain the new communication secret key. The decryption section 1342 calculates an exclusive disjunction of the decryption key obtained from the decryption key generation section 1341 and the second secret code, thereby obtaining the new communication secret key, for example.

Figure 5:
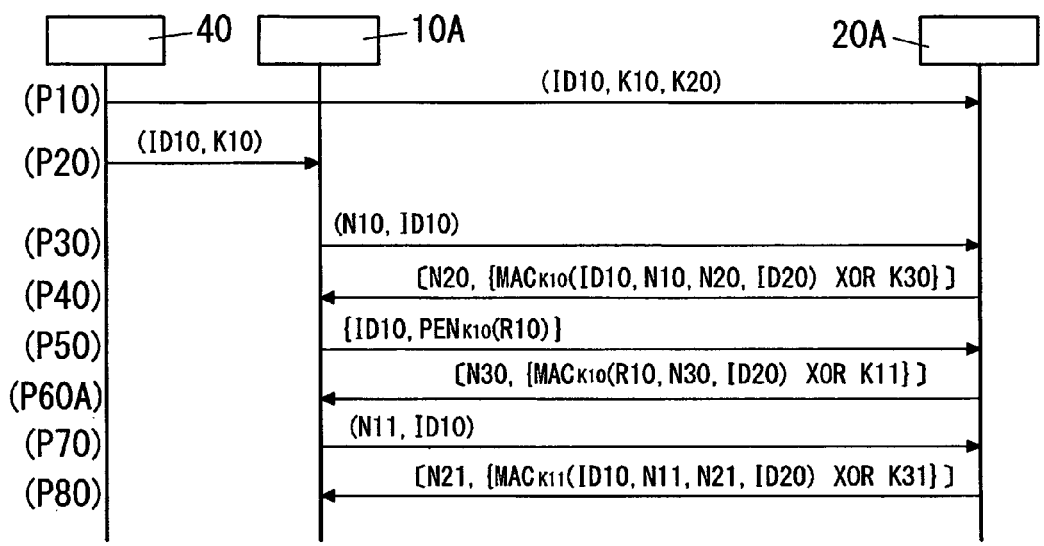
FIG. 5 is a diagram illustrating operation of the key distribution system of the second embodiment.

Next, an explanation is made to operation of the key distribution system of the present embodiment with reference to FIG. 5. Besides, processes P10, P20, P30, P40, P50, P70, and P80 have been already explained in the first embodiment, and no repeated explanations thereof are deemed necessary.

When the issuance request processing is started, the terminal 10A sends the identification information ID10 of the terminal 10A and the first secret code $PEN_{K10}(R10)$ to the server 20A (process P50).

When the second communication unit 22 receives the request message, the secret value obtaining section 2311 decrypts the first secret code $PEN_{K10}(R10)$ with the decryption secret key K20 stored in the second key storage unit 21, thereby obtaining the secret value R10.

Further, the key generation module 230 generates the new communication secret key K11 and the new decryption secret key K21 which is paired with the new communication secret key K11.

The encryption key generation section 2313 generates the encryption key defined as the message authentication code including the secret value R10 by use of, as the common key, the previous communication secret key K10 stored in the second key storage unit 21. In more detail, the encryption key generation section 2313 generates the encryption key ($=MAC_{K10}(I30)$) by use of the communication secret key K10 and information I30. The information I30 includes the secret value R10 received from the terminal 10A, a nonce (third nonce) N30, and the identification information ID20 of the server 20A. In other words, the information I30 is represented as a function (R10, N30, ID20). As understood from the above, the encryption key generation section 2313 generates the third nonce N30 in order to generate the encryption key. The third nonce N30 is different in a value from the second nonce N20 which generated at the time of issuing the session key. Besides, the second nonce N20 may be used instead of the third nonce N30. However, with using the third nonce N30 which is different in a value from the second nonce N20, the security of communication can be improved.

The encryption section 2312A encrypts the new communication secret key K11 by use of, as the common key, the encryption key ($=MAC_{K10}(R10, N30, ID20)$) obtained from the encryption key generation section 2313, thereby generating the second secret code. According to the present embodiment, the encryption section 2312A adopts the exclusive disjunction of the new communication secret key K11 and the encryption key ($=MAC_{K10}(R10, N30, ID20)$) as the second secret code.

The second keeping module 233 stores, in the second key storage unit 21, both the new communication secret key K11 and the new decryption secret key K21 which are generated by the key generation module 230.

The communication secret key transmission module 232 controls the second communication unit 22 so as to transmit the second secret code together with the third nonce N30 to the terminal 10A which requests issuance of the new communication secret key (process P60A in FIG. 5). In brief, the server 20A transmits the second secret code ($=[MAC_{K10}(R10, N30, ID20)$ XOR K11]) and the third nonce N30 to the terminal 10A.

Besides, the information I30 of the encryption key may include the identification information ID10 of the terminal 10A. In other words, the encryption key may have the same value as $MAC_{K10}(ID10, R10, N30, ID20)$.

When the first communication unit 12 receives the second secret code and the third nonce N30, the communication secret key decryption module 134A calculates a value ($=MAC_{K10}(R10, N30, ID20)$) identical to the encryption key by use of the secret value R10 stored in the secret value storage module 131, the identification information ID20 of the server 20A, the third nonce N30 received from the server 20A, and the previous communication secret key K10, thereby generating the decryption key.

The decryption section 1342 calculates an exclusive disjunction of the decryption key ($=MAC_{K10}(R10, N30, ID20)$) obtained from the decryption key generation section 1341 and the second secret code ($=[MAC_{K10}(R10, N30, ID20)$ XOR K11]), thereby obtaining the new communication secret key K11. Besides, when the information I30 includes the identification information ID10 of the terminal 10A, the identification information ID10 is further used to generate the decryption key.

The first keeping module 135 stores in the first key storage unit 11 the new communication secret key K11 obtained by the communication secret key decryption module 134A.

As described in the above, with using the message authentication code as the encryption key, it is possible to more reduce the probability of leakage of the new communication secret key K11. In addition, with performing the message authentication, it enables both the server 20A and the terminal 10A to detect the communication secret key tampered by an unauthorized person. Therefore, it is possible to improve the security of the encrypted communication using the communication secret key.

Moreover, when the terminal 10A is connected to the server 20A, the server 20A may send a challenge code to the terminal 10A. In this instance, the terminal 10A may be configured to prohibit the issuance request processing unless the terminal 10A receives the challenge code from the server 20A. With this arrangement, it is possible to prevent DoS (Denial of Service attack) which increases traffic to the server 20A so as to make the server 20A unable to provide its services.

Besides, the server 20A may be configured to send the session key together with the new communication secret key to the terminal 10A In this modification, the session key issuance unit 25 is configured to perform the processing of issuing the session key in response to the request of issuing the new communication secret key from the terminal 10.

Upon receiving the request message from the terminal 10, the session key issuance unit 25 generates the session key. Additionally, the session key issuance unit 25 encrypts the session key with the communication secret key stored in the second key storage unit 21. The session key issuance unit 25 generates the second message authentication code (second message code) by use of the communication secret key in order to encrypt the session key. The session key issuance unit 25 uses an exclusive disjunction of the second message authentication code and the session key as the encrypted session key. The information necessary for generating the second message authentication code includes the identification information and the secret value which are received from the terminal 10, the second nonce, and the identification information of the server 20. The session key issuance unit 25 provides the encrypted session key to the communication secret key transmission unit 232. In addition, the session key issuance unit 25 provides the second nonce to the encryption key generation section 2313 of the communication secret key encryption module 231A.

Figure 6:
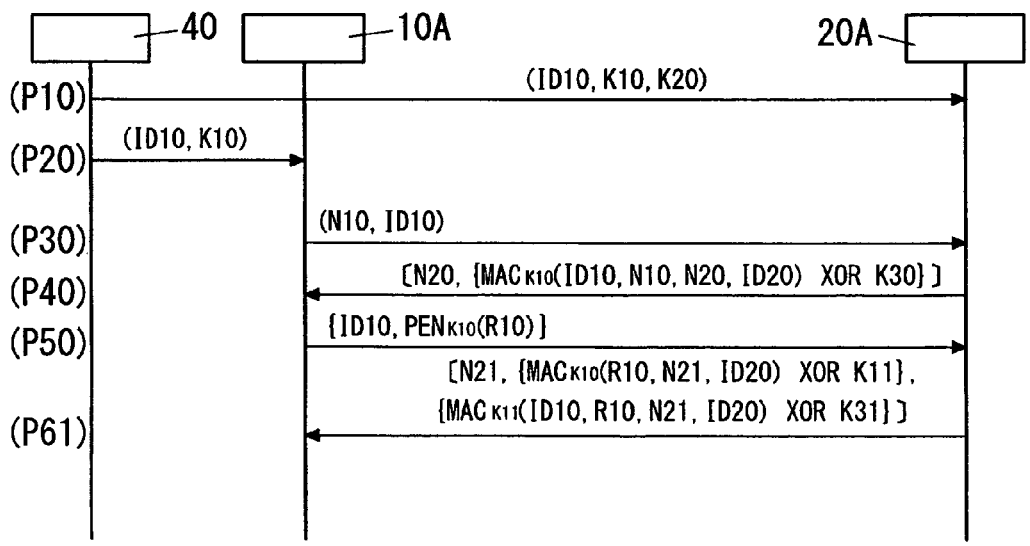
FIG. 6 is a diagram illustrating operation of the modification of the key distribution system of the second embodiment.

Next, an explanation is made to operation of the key distribution system of the modification of the present embodiment with reference to FIG. 6. Besides, processes P10, P20, P30, P40, and P50 have been already explained in the first embodiment, and no repeated explanations thereof are deemed necessary.

When the issuance request processing is started, the terminal 10A sends the identification information ID10 of the terminal 10A and the first secret code $PEN_{K10}(R10)$ to the server 20A (process P50).

When the second communication unit 22 receives the request message, the session key issuance unit 25 generates the new session key K31 which is different from the session key K30. The session key issuance unit 25 generates the second message authentication code $MAC_{K11}(I22)$ by use of the communication secret key K12 stored in the second key storage unit 21 and information I22. The information I22 includes the identification information ID10 of the terminal 10A and the secret value R10 received from the terminal 10A, the second nonce N21, and the identification information ID20 of the server 20. In other words, the information I22 is represented as a function (ID10, R10, N21, ID20).

The session key issuance unit 25 provides the encrypted session key ($=[MACK11(ID10, R10, N21, ID20)$ XOR K31]) to the communication secret key transmission unit 223. Further, the session key issuance unit 25 provides the second nonce N21 to the encryption key generation section 2313.

In the key issuance unit 23A, the secret value obtaining section 2311 decrypts the first secret code $PEN_{K10}(R10)$, thereby obtaining the secret value R10.

The encryption key generation section 2313 generates the encryption key ($=MAC_{K10}(I31)$) by use of the communication secret key K10 and information I31. The information I31 includes the secret value R10 received from the terminal 10A, the second nonce N21 obtained from the session key issuance unit 25, and the identification information ID20 of the server 20A. In other words, the information I31 is represented as a function (R10, N21, ID20).

The encryption section 2312A adopts an exclusive disjunction (=[$MAC_{K10}$(R10, N21, ID20) XOR K11]) of the new communication secret key K11 and the encryption key (=$MAC_{K10}$(R10, N21, ID20)) as the second secret code.

The communication secret key transmission module 232 controls the second communication unit 22 so as to transmit the encrypted session key and the second nonce N21 together with the second secret code to the terminal 10A which requests issuance of the new communication secret key K11 (process P61 in FIG. 6). Thus, according to the modification, the server 20A transmits to the terminal 10A the second secret code (=[$MAC_{K10}$(R10, N21, ID20) XOR K11]), the encrypted session key (=[$MAC_{K11}$(ID10, R10, N21, ID20) XOR K31]), and the second nonce N21.

Upon receiving from the server 20A the second secret code (=[$MAC_{K10}$(R10, N21, ID20) XOR K11]), the encrypted session key (=[$MAC_{K11}$(ID10, R10, N21, ID20) XOR K31]), and the second nonce N21, the terminal 10A performs the aforementioned processing, thereby obtaining the new communication secret key K11 and the new session key K31.

Accordingly, the aforementioned modification can distribute to the terminal 10A the new communication secret key K11 and the session key K31 simultaneously. Therefore, in contrast to the instance shown in FIG. 5, it is possible to reduce traffic between the server 20A and the terminal 10A. Consequently, it enables to reduce electric power necessary for the communication between the server 20A and the terminal 10A, thereby reducing energy consumption in the key distribution system.

According to this modification, the key issuance unit 23A uses the second nonce generated by the session key issuance unit 25. However, the session key issuance unit 25 may use the third nonce generated by the key issuance unit 23A rather than the second nonce.

According to the present embodiment, the message authentication is implemented by use of the KryptoKnight. However, the Kerberos may be adopted for the message authentication. The Kerberos uses time instead of nonce. Consequently, in the Kerberos, management of performance of nonce or random number is replaced by management of time.

Third Embodiment

Figure 7:
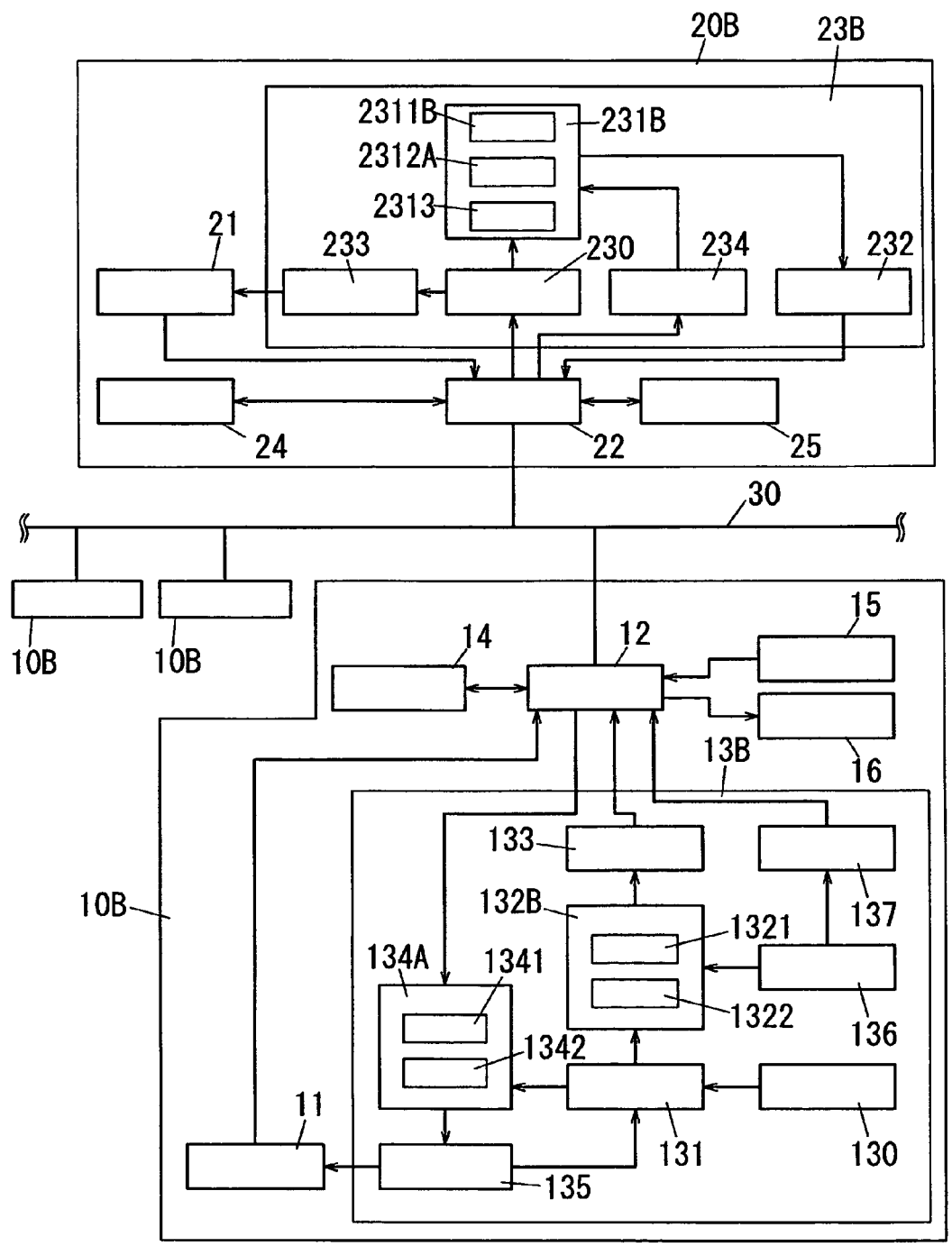
FIG. 7 is a block diagram illustrating the key distribution system of the third embodiment.

As shown in FIG. 7, the key distribution system of the present embodiment is different from the second embodiment in both the terminal 10B and the server 20B. Components of the key distribution system which are common to the present embodiment and the second embodiment are designated by the same reference numerals, and no explanations thereof are deemed necessary.

The terminal 10B is different from the terminal 10A of the second embodiment in the key request unit 13B.

The key request unit 13B includes the secret value generation module 130, the secret value storage module 131, the secret value encryption module 132B, the secret value transmission module 133, the communication secret key decryption module 134A, the first keeping module 135, a random number generation module 136, and a random number transmission module 137.

The random number generation module 136 is configured to generate a second random number which is distinguished from the first random number which is used as the secret value. The random number generation module 136 provides the second random number to both the secret value encryption module 132B and the random number transmission module 137. The second random number is preferred to be a numerical value bigger in the number of digits than the secret value. The probability of leakage of the secret value can be decreased with an increase in the number of digits of the second random number.

The random number transmission module 137 is configured to control the first communication unit 12 in a manner to transmit to the server 20B the second random number received from the random number generation module 136. Preferably, the second random number is sent to the server 20B before the issuance request processing is carried out. For example, the random number transmission module 137 is configured to send the second random number to the server 20B when the terminal 10B is connected to the communication network 30.

The secret value encryption module 132B includes a communication numerical value generation section 1321 and a communication numerical value encryption section 1322.

The communication numerical value generation section 1321 is configured to generate a communication numerical value greater in the number of digits than the secret value stored in the secret value storage module 131. The communication numerical value generation section 1321 generates the communication numerical value by simple arithmetic operation of combining the second random number obtained from the random number generation module 136 and the secret value stored in the secret value storage module 131. In the present embodiment, the communication numerical number generation section 1321 operates to concatenate the second random number to the secret value for generation of the communication numerical value with increased number of digits. The communication numerical value is expressed by "R10∥R20", in which R10 and R20 represent the secret value and the second random number, respectively. The expression "x∥y" indicates simple arithmetic operation of linking the right value y to the left value x. This simple operation is referred to as concatenation. For example, the expression "123∥123" gives the numerical value of "123123". Thus, the communication numerical value is made up by the upper digits of the secret value and the lower digits of the second random number. In this manner, the communication numerical value generation section 1321 performs the simple concatenation of linking the second random number to the secret value for generation of the communication numerical value. For example, when the secret value is a three-digit number of "123" and the second random number is a three-digit number of "456", the communication numerical value is "123456" expressed by "123∥456". Besides, the communication numerical value generation section 1321 may give a sum or product of the secret value and the second random number as the communication numerical value. In summary, the communication numerical value has to be more complex than the secret value.

The communication numerical value encryption section 1322 is configured to encrypt the communication numerical value generated by the communication numerical value generation section 1321 so as to generate the first secret code. The communication numerical value encryption section 1322 encrypts the communication numerical value by use of, as the public key, the communication secret key stored in the first key storage unit 11. For example, the communication numerical value encryption section 1322 encrypts the communication numerical value in the public key cryptography (e.g., RSA) using the communication secret key stored in the first key storage unit 11 at the time of starting the processing of requesting issuance of the new communication secret key, thereby generating the first secret code.

As described in the above, the key request unit 23B of the present embodiment generates the first random number used as the secret value, and further generates the second random number. The key request unit 23B sends the second random number to the server 20B before requesting the server 20B to issue the new communication secret key. The key request unit 23B performs the simple operation of the first and second random numbers to generate the communication numerical value. The key request unit 23B encrypts the communication numerical value with the public key (communication secret key, in the present embodiment) stored in the first key storage unit 11, and sends the encrypted communication numerical value to the server 20.

The server 20B is different from the server 20A of the second embodiment in the key issuance unit 23B.

The key issuance unit 23B includes the key generation module 230, the communication secret key encryption module 231B, the communication secret key transmission module 232, the second keeping module 233, and a random number storage module 234.

For example, the random number storage module 234 is configured to store the second random number which the second communication unit 22 has received from the terminal 10B.

The communication secret key encryption module 231B includes the secret value obtaining section 2311B, the encryption section 2312A, and the encryption key generation section 2313.

When the second communication unit 22 receives the request message, the secret value obtaining section 2311B decrypts the first secret code received by the second communication unit 22, thereby obtaining the communication numerical value. The secret value obtaining section 2311B decrypts the first secret code with the decryption secret key paired with the communication secret key. Further, the secret value obtaining section 2311B performs the simple operation of the obtained communication numerical value and the second random number stored in the random number storage module 234, thereby obtaining the secret value.

Figure 8:
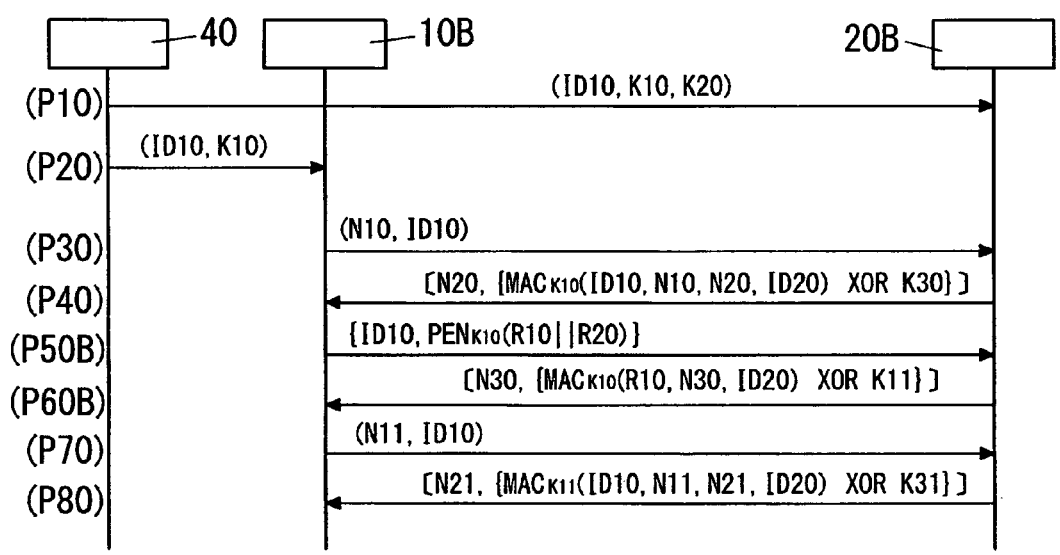
FIG. 8 is a diagram illustrating operation of the key distribution system of the third embodiment.

Next, an explanation is made to operation of the key distribution system of the present embodiment with reference to FIG. 8. Besides, processes P10, P20, P30, P40, P70, and P80 have been already explained in the first embodiment, and no repeated explanations thereof are deemed necessary. A duplicated explanation of processes P50B and P50 is deemed unnecessary, and also a duplicated explanation of processes P60B and P60A is deemed unnecessary.

When the issuance request processing is started, the communication numerical value generation section 1321 generates the communication numerical value R10∥R20 by means of the simple operation of the second random number R20 obtained from the random number generation module 136 and the secret value R10 stored in the secret value storage module 131.

The communication numerical value encryption section 1322 encrypts the communication numerical value R10∥R20 by use of, as the public key, the communication secret key K10 stored in the first key storage unit 11, thereby generating the first secret code $PEN_{K10}(R10\|R20)$.

The secret value transmission module 133 controls the first communication unit 12 so as to transmit to the server 20B the first secret code $PEN_{K10}(R10\|R20)$ together with the identification information ID10 of the terminal 10B and the request message (process P50B in FIG. 8).

As described in the above, the terminal 10B sends the identification information ID10 of the terminal 10B and the first secret code $PEN_{K10}(R10\|R20)$ in order to request the server 20B to issue the communication secret key.

When the second communication unit 22 receives the request message, the secret value obtaining section 23116 decrypts the first secret code $PEN_{K10}(R10\|R20)$ with the decryption secret key K20 stored in the second key storage unit 21, thereby obtaining the communication numerical value R10∥R20. Further, the secret value obtaining section 2311B obtains the secret value R10 by means of the simple operation of the second random number R20 stored in the random number storage module 137 and the communication secret value R10∥R20. In brief, the secret value obtaining section 2311B removes the second random number R20 from the communication numerical value R10∥R20.

The encryption section 2312A encrypts the new communication secret key K11 by use of, as the common key, the encryption key $(=MAC_{K10}(R10, N30, ID20))$ obtained from the encryption key generation section 2313, thereby generating the second secret code $(=[MAC_{K10}(R10, N30, ID20) XOR])$.

The communication secret key transmission module 232 controls the second communication unit 22, thereby sending the second secret code and the third nonce N30 to the terminal 10B which requests issuance of the new communication secret key (process P60B in FIG. 8).

Thus, the server 20B sends the second secret code $(=[MAC_{K10}(R10, N30, ID20) XOR K11])$ to the terminal 10B.

As described in the above, the terminal 10B makes the issuance request processing of generating the communication numerical value R10∥R20 having the number of digits greater than the secret value R10, followed by sending the same to the server 20B. Although there is a chance of the communication numerical value R10∥R20 being accessible to an unauthorized person, the person is not able to know how the communication numerical value R10∥R20 is generated from the secret value R10 and the second random number R20 because of the increased number of the digits given to the communication numerical value R10∥R20. Therefore, it is practically impossible to reveal the secret value R10 by all-possible regression methods or the like only within a short time period where the secret value R10 is valid.

According to the key distribution system of the present embodiment, the terminal 10B generates the communication numerical value by use of the secret value, and sends it to the server 20B. Since the communication numerical value is greater in the number of digits than the secret value, in contrast to an instance where the secret value itself is transmitted, it is possible to greatly reduce the chance of an unauthorized person being able to obtain the secret value.

Increasing the number of digits of the secret value also can greatly reduce the chance of an unauthorized person being able to obtain the secret value. However, this causes an increase in the amount of the processing of the server 20B and the terminal 10B.

In contrast, the key distribution system of the present embodiment uses the communication numerical value greater in the number of digits than the secret value only when the terminal 10B sends the secret value to the server 20B. That is, the communication numerical number which is greater in the number of digits than the secret value is not used for encryption and decryption of the communication secret key. In other words, the key distribution system of the present embodiment increases the number of digits of the secret value only when the secret value is sent to the server 20B. Consequently, this does not cause a great increase in the amount of the processing of the server 20B and the terminal 10B.

As described in the above, the key distribution system of the present embodiment can reduce the chance of an unauthorized person being able to obtain the secret value, and can suppress an increase in the amount of the processing of the server 20B and the terminal 10B.

Fourth Embodiment

Figure 9:
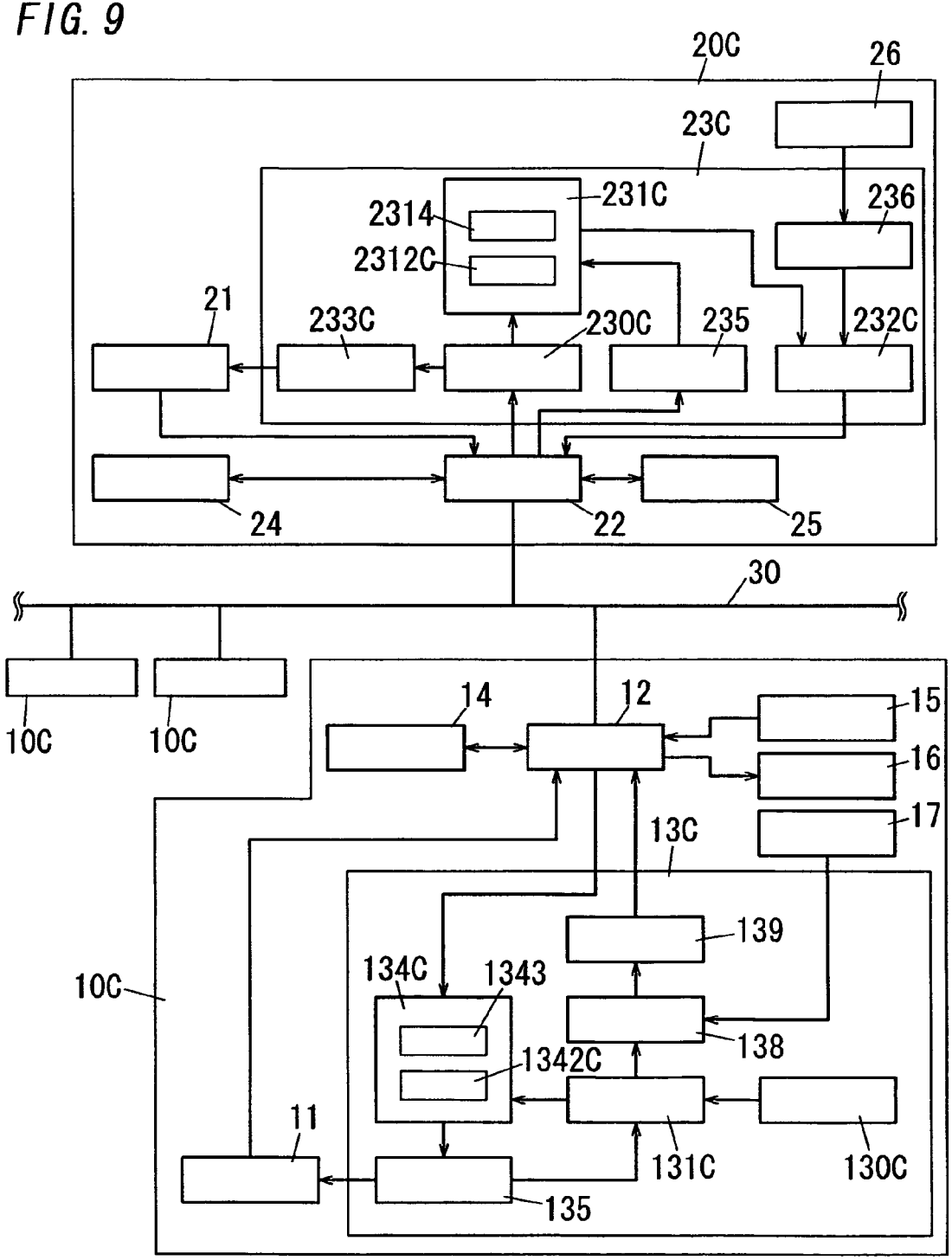
FIG. 9 is a block diagram illustrating the key distribution system of the fourth embodiment.

As shown in FIG. 9, the key distribution system of the present embodiment is different from the second embodiment in both the terminal 10C and the server 20C. Components of the key distribution system which are common to the present embodiment and the second embodiment are designated by the same reference numerals, and no explanations thereof are deemed necessary.

The terminal 10C includes the first key storage unit 11, the first communication unit 12, the key request unit 13C, the first identification information storage unit 14, the session key request unit 15, the session key reception unit 16, and a first primitive root storage unit 17. No explanations are made to components common to the terminals 10C and 10A.

The first primitive root storage unit 17 is configured to store a prime number p and a primitive root g. Preferably, the prime number p is selected to have relatively big numerical value, and the primitive root g is appropriately selected. In view of communication security, the prime number p and the primitive root g are preferred to be kept secret. When the prime number p and the primitive root g are kept secret, the management device 40 provides the prime number p and the primitive root g to the terminal 10C.

The key request unit 13C includes the secret value generation module (first secret value generation module) 130C, the secret value storage module (first secret value storage module) 131C, a first public key generation module 138, and a first public key transmission module 139.

The secret value generation module 130C generates newly the secret value (first secret value) defined as a numerical value when the terminal requests issuance of the new communication secret key. The first secret value is a random number.

The secret value storage module 131C is configured to store the first secret value generated by the secret value generation module 130C.

The first public key generation module 138 is configured to apply the first secret value stored in the secret value storage module 131C to the primitive root stored in the first primitive root storage unit 17 to generate, as the first secret code, a first public key K41 based on the Diffie-Hellman key agreement protocol. When the first secret value is x, the first public key K41 is represented as a remainder $R^x$ ($=g^x$ mod p) on division of $g^x$ by p as a divisor.

The first public key transmission module 139 is configured to control the first communication unit 12 in a manner to transmit to the server 20 the first public key K41 generated by the first public key generation module 138, in addition to the request message (request command) of requesting issuance of the new communication secret key. The first public key transmission module 139 controls the first communication unit 12 in a manner to transmit the identification information of the terminal 10C together with the first public key K41.

As described in the above, the key request unit 13C generates newly the first secret value defined as a numerical value in order to request the server 20C to issue the new communication secret key. The key request unit 13C generates the first public key K41 based on the Diffie-Hellman key agreement protocol by use of the primitive root stored in the first primitive root storage unit 17 and the first secret value. The key request unit 13C sends the first public key K41 to the server 20C.

The server 20C includes the second key storage unit 21, the second communication unit 22, the key issuance unit 23C, the second identification information storage unit 24, the session key issuance unit 25, and a second primitive root storage unit 26. No explanations are made to components common to the server 20C and 20A.

The second primitive root storage unit 26 is configured to store the prime number p of a big numerical value and the proper primitive root g, in a similar manner as the first primitive root storage unit 17. When the prime number p and the primitive root g are kept secret, the management device 40 provides the prime number p and the primitive root g to the server 20C.

The key issuance unit 23C includes the key generation module 230C, the communication secret key encryption module 231C, the communication secret key transmission module 232C, the second keeping module 233C, a second secret value generation module 235, and a second public key generation module 236.

The key generation module 230C is configured to generate the new communication secret key, when the second communication unit 22 receives the request message from the terminal 10C.

The second secret value generation module 235 is configured to generate a second secret value defined as a numerical value when the second communication unit 22 receives the request message. The second secret value is a random number. In other words, the second secret value generation module 235 generates the second secret value having a random numerical value every time the request message is received. Therefore, the second secret value is changed every time the communication secret key is issued. The server uses the same second secret value until the new communication secret key is transmitted to the terminal 10C.

The communication secret key encryption module 231C includes a second common key generation module 2314 and the encryption section 2312C.

The second common key generation module 2314 is configured to, when the second communication unit 22 receives the request message, generate a common key K40 based on the Diffie-Hellman key agreement protocol by use of the first public key K41 received by the second communication unit 22 and the second secret value generated by the second secret value generation module 235. When the second secret value is y, the common key K40 is represented as a remainder $R^{xy}$ ($=g^{xy}$ mod p) on division of $(R^x)^y$ by p (p is defined as a divisor). This common key K40 ($=R^{xy}$) is congruent to $g^{xy}$ modulo the prime number p as a divisor. That is, a relation of $R^{xy}=g^{xy}$ mod p is fulfilled.

The encryption section 2312C is configured to encrypt the new communication secret key with the common key K40 obtained from the second common key generation module 2314 so as to generate the second secret code. In the present embodiment, the encryption section 2312C generates an encryption key defined as a message authentication code, by use of the common key K40. The encryption section 2312C encrypts the new communication secret key by use of the common key cryptography using the encryption key, thereby generating the second secret code. The encryption section 2312C uses, as the second secret key (encrypted new communication secret key), an exclusive disjunction of the encryption key and the new communication secret key, for example.

The second public key generation module 236 is configured to apply the second secret value generated by the second secret value generation module 235 to the primitive root stored in the second primitive root storage module 26 so as to generate a second public key K42 based on the Diffie-Hellman key agreement protocol. When the second secret value is y, the second public key K42 is represented as a remainder $R^y$ ($=g^y$ mod p) on division of $g^y$ by p as a divisor.

The communication secret key transmission module 232C is configured to control the second communication unit 22 in a manner to transmit to the terminal 10C the second secret code generated by the communication secret key encryption module 231C together with the second public key K42 generated by the second public key generation module 236.

The second keeping module 233C is configured to store the new communication secret key generated by the key generation module 230C in the second key storage unit 21. Besides, the second keeping module 233C may be configured to update the old communication secret key stored in the second key storage unit 21 to the new communication secret key generated by the key generation module 230C.

As described in the above, the key issuance unit 23C generates the second secret value defined as a numerical value in response to the request of issuing the new communication secret key from the terminal 10C. The key issuance unit 23C generates the common key 40 based on the Diffie-Hellman key agreement protocol by use of the first public key received from the terminal 10C and the second secret key. The key issuance unit 23C generates the second public key K42 by applying the second secret value to the primitive root stored in the second primitive root storage unit 26. The key issuance unit 23C encrypts the new communication secret key with the common key K40, and sends to the terminal 10C the encrypted new communication secret key together with the second public key K42.

In addition, the key issuance unit 23C issues the new communication secret key and stores it in the second key storage unit 21 in response to the request of issuing the new communication secret key from the terminal 10C. Therefore, the second communication unit 22 uses the new communication secret key in order to establish the encrypted communication with the terminal 10C by use of the common key cryptography using the communication secret key.

The key request unit 13C further includes the communication secret key decryption module 134C and the first keeping module 135.

The communication secret key decryption module 134C includes a first common key generation module 1343 and the decryption section 1342C.

The first common key generation module 1343 is configured to, when the first communication unit 12 receives the second secret code and the second public key K42, generate the common key K40 based on the Diffie-Hellman key agreement protocol by use of the first secret value x stored in the secret value storage module 131C and the second public key K42. As described in the above, the common key K40 is represented as the remainder $R^{xy}$ ($=g^{xy}$ mod p), and the second public key is represented as the remainder $R^y$ ($=g^y$ mod p). Consequently, the common key K40 can be generated by use of both the first secret value x and the second public key K42.

The decryption section 1342C is configured to decrypt the second secret code received by the first communication unit 12 with the common key K40 generated by the first common key generation module 1343 so as to obtain the new communication key. In the present embodiment, the decryption section 1342C generates, by use of the common key K40, an encryption key which is a message authentication code identical to the encryption key generated by the encryption section 2312C. The decryption section 1342C decrypts the second secret code by use of the common key cryptography using the decryption key, thereby obtaining the new communication secret key. For example, the decryption section 1342C calculates an exclusive disjunction of the decryption key and the second secret code, thereby obtaining the new communication secret key.

As described in the above, upon receiving the encrypted new communication secret key (second secret code) and the second public key K42 from the server 20C, the key request unit 13C generates the common key K40 by use of the first secret value as well as the second public key which is received from the server 20C. The key request unit 13C obtains the new communication secret key by decrypting the second secret code with the common key K40, and stores the new communication secret key in the first key storage unit 11. Consequently, the first communication unit 12 uses the new communication secret key in order to establish the encrypted communication with the server 20C by use of the common key cryptography using the communication secret key.

Figure 10:
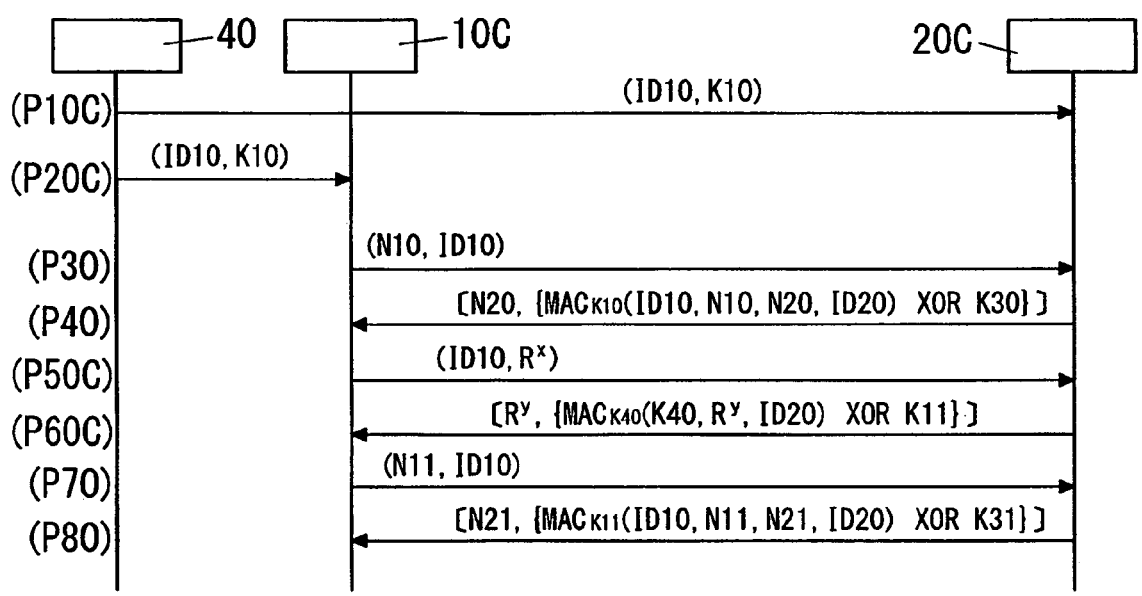
FIG. 10 is a diagram illustrating operation of the key distribution system of the fourth embodiment.

Next, an explanation is made to operation of the key distribution system of the present embodiment with reference to FIG. 10. Besides, processes P30, P40, P70 and P80 have been already explained in the first embodiment, and no explanations thereof are deemed necessary.

Besides, before shipment of the terminal 10C, processing of registering the communication secret key in the terminal 10C and processing of registering the communication secret key in the server 20C are performed. The management device 40 is used for registration of the communication secret key. In the processing of registering the communication secret key, the management device 40 is connected to the server 20C and the terminal 10C via a communication path such as the Internet.

As shown in FIG. 10, the management device 40 sends the communication secret key K10 to the server 20C (process P10C in FIG. 10). The server 20C registers the communication secret key K10 received from the management device 40 in the second key storage unit 21.

The management device 40 sends to the server 20C the identification information (terminal identification information) ID10 for identifying the terminal 10C. The server 20C registers the identification information I010 received from the management device 40 in the second identification information storage unit 24.

The management device 40 sends to the terminal 10C both the identification information ID10 of the terminal 10C and the communication secret key K10 registered in the server 20C (process P20C in FIG. 10). The terminal 10C registers the identification information ID10 received from the management device 40 in the first identification information storage unit 14. In addition, the terminal 10C registers the communication secret key K10 received from the management device 40 in the first key storage unit 11.

That is, the communication secret key K10 is registered, as an initial secret key, in both the second key storage unit 21 of the server 20C and the first key storage unit 11 of the terminal 10C. The present embodiment is different from the second embodiment in that the decryption secret key K20 which is an initial secret key paired with the communication secret key K10 is not registered in the second key storage unit 21 of the server 20.

When the issuance request processing is started, the secret value generation module 130C generates the first secret value x. The secret value storage module 131C stores the secret value x. The first public key generation module 138 generates the first public key K41 by use of the first secret value x stored in the secret value storage module 131C together with the primitive root g and the prime number p stored in the first primitive root storage unit 17. The first public key transmission module 139 controls the first communication unit 12 so as to send to the server 20C the first public key K41 together with the identification information ID10 of the terminal 10C and the request message (process P50C in FIG. 10). Thus, the terminal 10C transmits both the identification information ID10 of the terminal 10C and the first public key K41 (=$R^x$) in order to request the server 20C to issue the communication secret key.

When the second communication unit 22 receives the request message, the second secret value generation module 235 generates the second secret value y.

The second public key generation module 236 applies the second secret value y generated by the second secret value generation module 235 to the primitive root g stored in the second primitive root storage module 26, thereby generating the second public key K42 (=$R^y$).

The second common key generation module 2314 generates the common key K40 by use of the first public key K41 received by the second communication unit 22 and the second secret value y generated by the second secret value generation module 235.

The encryption section 2312C generates the encryption key $MAC_{K40}(I40)$) by use of the common key K40 and information I40. The information I40 includes the second public key K42 (=$R^y$) and the identification information I020 of the server 20C. That is, the information I40 is represented as a function (K40, $R^y$, ID20). The remainder $R^y$ is generated from the second secret value y which is a random number. Therefore, the remainder $R^y$ is available as a nonce.

The encryption section 2312C uses, as the second secret code (encrypted new communication secret key), an exclusive disjunction (=$[MAC_{K40}(K40, R^y, ID20)$ XOR K11]) of the encryption key (=$MAC_{K40}(K40, R^y, ID20)$) and the new communication secret key K11. The common key K40 is generated by use of the first secret value x. In view of this, it is considered the communication secret key encryption module 231C encrypts the new communication secret key K11 with the first secret value x.

The communication secret key transmission module 232C controls the second communication unit 22 so as to transmit to the terminal 10C the second secret code (=$[MAC_{K40}(K40, R^y, ID20)$ XOR K11]) and the second public key K42 (=$R^y$) (process P60C in FIG. 10).

The second keeping module 233C stores the new communication secret key K11 generated by the key generation module 230C in the second key storage unit 21.

As mentioned in the above, the server 20C sends the second secret code and the second public key K42 to the terminal 10C.

When the first communication unit 12 receives the second secret code and the second public key K42, the first common key generation module 1343 generates the common key K40 based on the Diffie-Hellman key agreement protocol by use of the first secret value x stored in the secret value storage module 131C and the second public key K42.

As explained in the above, the first common key generation module 1343 determines the value of ($R^y$)$^x$ on the basis of the first secret value x and the remainder $R^y$. When $R^{yx}$=($R^y$)$^x$ mod p, $R^{yx}$ is congruent to $g^{xy}$ modulo the prime number p as a divisor. Therefore, $R^{xy}$=R. Consequently, the first common key generation module 1343 can generate the common key K40.

The encryption section 1342C generates the decryption key by use of the common key K40 generated by the first common key generation module 1343, the identification information ID20 of the server 20C, and the second public key K42 received from the server 20C. The encryption section 1342C calculates an exclusive disjunction of the generated decryption key (=$MAC_{K40}(K40, R^y, ID20)$) and the second secret code (=$[MAC_{K40}(K40, R^y, ID20)$ XOR K11]), thereby obtaining the new communication secret key K11.

The first keeping module 135 stores the new communication secret key K11 obtained by the communication secret key decryption module 134C in the first key storage unit 11.

After the first key storage unit 11 stores the new communication secret key K11, the first communication unit 12 uses the new communication secret K11 for establishing the encrypted communication with the server 20C by use of the common key cryptography. After the second key storage unit 21 stores the new communication secret key K11, the second communication unit 22 uses the new communication secret K11 for establishing the encrypted communication with the terminal 10C by use of the common key cryptography.

Accordingly, after the new communication secret key K11 is issued, an unauthorized person cannot eavesdrop on the communication between the terminal 10C and the server 20C even if the unauthorized person knows the previous communication secret key K10.

As described in the above, the key distribution system of the present embodiment encrypts the new communication secret key K11 with the common key K40 in conformity with the Diffie-Hellman key agreement protocol, and transmits the encrypted new communication secret key K11 to the terminal 10C. Consequently, even an unauthorized person who knows the previous communication secret key K10 cannot decrypt the encrypted new communication secret key K11. Therefore, it is possible to deliver the new communication secret key K11 to the terminal 10C in a secure manner.

The invention claimed is:

1. A key distribution system comprising:
a terminal; and
a server connected to said terminal by way of a communication network,
wherein
said terminal comprises:
a first key storage unit configured to store a communication secret key and a public key in a rewritable manner;
a first communication unit configured to establish encrypted communication with said server by use of a common key cryptography using the communication secret key stored in said first key storage unit; and
a key request unit configured to, when requesting said server to issue a new communication secret key,
generate newly a secret value defined as a numerical value, and
generate a first secret code by encrypting the secret value with the public key stored in said first key storage unit, and
send the first secret code to said server,
wherein
said server comprises:
a second key storage unit configured to store a decryption secret key and the communication secret key in a rewritable manner, the decryption secret key being defined as a private key paired with the public key;
a second communication unit configured to establish the encrypted communication with said terminal by use of the common key cryptography using the communication secret key stored in said second key storage unit; and a key issuance unit configured to issue the new communication secret key in response to a request of issuing new communication secret keys from said terminal, and store the new communication secret key in said second key storage unit, and obtain the secret value by decrypting the first secret code with the decryption secret key, and generate a second secret code by encrypting the new communication secret key with the secret value, and send the second secret code to said terminal requesting issue of the new communication secret key, and wherein said key request unit is configured to decrypt the second secret code with the secret value to obtain the new communication secret key and store the obtained new communication secret key in said first key storage unit, said first communication unit being configured to, after the new communication secret key is stored in said first key storage unit, use the new communication secret key for establishing the encrypted communication with said server by use of the common key cryptography, and said second communication unit being configured to, after the new communication secret key is stored in said second key storage unit, use the new communication secret key for establishing the encrypted communication with said terminal by use of the common key cryptography, and wherein said key request unit is configured to generate a first random number used as the secret value, and a second random number, and send the second random number to said server before requesting said server to issue the new communication secret key, and generate a communication numerical value by use of the first random number and the second random number, and encrypt the communication numerical value with the public key, and send the encrypted communication numerical value to said server, and said key issuance unit is configured to store the second random number received from said terminal, and upon receiving the encrypted communication numerical value, decrypt the encrypted communication numerical value with the decryption secret key to obtain the communication numerical value, and obtain the first random number by use of the obtained communication numerical value and the stored second random number.

2. The key distribution system as set forth in claim 1, wherein said key request unit is configured to encrypt the newly generated secret value by use of, as the public key, said communication secret key stored in said first key storage unit, when requesting said server to issue the new communication secret key, said key issuance unit being configured to issue a new decryption secret key defined as a private key paired with the new communication secret key, in addition to the new communication secret key, in response to the request of issuing the new communication secret key from said terminal, and store the new decryption secret key in said second key storage unit, and said key issuance unit being configured to, after the new decryption secret key is stored in said second key storage unit, use the new decryption secret key for decrypting the first secret code.

3. The key distribution system as set forth in claim 1, wherein said key issuance unit is configured to, in response to the request of issuing the new communication secret key from said terminal, issue a message code including the secret value received from said terminal, and encrypt the new communication secret key with the message code, and send the encrypted new communication secret key to said terminal.

\* \* \* \* \*

UNITED STATES PATENT AND TRADEMARK OFFICE
CERTIFICATE OF CORRECTION

PATENT NO. : 8,600,063 B2
APPLICATION NO. : 12/998805
DATED : December 3, 2013
INVENTOR(S) : Naohiro Fukuda It is certified that error appears in the above-identified patent and that said Letters Patent is hereby corrected as shown below:

On the Title page, first column, Item (73), replace the Assignee as follows:

from

Panasonic Electric Works Co., Ltd., Osaka (JP)

to

Panasonic Corporation, Kadoma-shi (JP)

Signed and Sealed this
Twelfth Day of August, 2014

Michelle K. Lee
*Deputy Director of the United States Patent and Trademark Office*